US011146952B2

(12) United States Patent
Sheng et al.

(10) Patent No.: US 11,146,952 B2
(45) Date of Patent: Oct. 12, 2021

(54) DATA TRANSMISSION SECURITY PROTECTION METHOD AND NETWORK DEVICE

(71) Applicant: HUAWEI TECHNOLOGIES CO., LTD., Shenzhen (CN)

(72) Inventors: De Sheng, Shanghai (CN); Yun Qin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 16/278,162

(22) Filed: Feb. 17, 2019

(65) Prior Publication Data

US 2019/0191307 A1  Jun. 20, 2019

Related U.S. Application Data

(63) Continuation of application No. PCT/CN2017/075617, filed on Mar. 3, 2017.

(30) Foreign Application Priority Data

Aug. 17, 2016  (CN) .......................... 201610679364.6

(51) Int. Cl.
*H04W 12/06* (2021.01)
*H04L 9/08* (2006.01)
(Continued)

(52) U.S. Cl.
CPC .............. *H04W 12/06* (2013.01); *H04L 9/08* (2013.01); *H04L 9/0819* (2013.01);
(Continued)

(58) Field of Classification Search
CPC ....... H04L 9/08; H04L 9/0819; H04L 9/0838; H04L 63/162; H04W 12/06;
(Continued)

(56) References Cited

U.S. PATENT DOCUMENTS 8,010,801 B2   8/2011  Qi et al.
10,291,589 B1*  5/2019  Sharifi Mehr .......... H04L 67/32
(Continued)

FOREIGN PATENT DOCUMENTS

CN   101013940 A   8/2007
CN   101119199 A   2/2008
(Continued)

OTHER PUBLICATIONS

"IEEE Standard for Local and Metropolitan Area Networks: Media Access Control (MAC) Security," in IEEE Std 802.1AE-2006 , vol., No., pp. 1-150, Aug. 18, 2006 [online][retrieved on Dec. 28, 2020], Retrieved from: IEEEXplore (Year: 2006).*

(Continued)

*Primary Examiner* — Kevin Bechtel
*Assistant Examiner* — Sangseok Park
(74) *Attorney, Agent, or Firm* — Maier & Maier, PLLC

(57) ABSTRACT

The method includes: receiving, by a first member device, a second EAPOL-MKA packet sent by a second member device; determining, by the first member device, a first cipher suite, and determining a first secure association key SAK corresponding to the first cipher suite; and sending, by the first member device, the first cipher suite and the first SAK to the second member device in CA. Based on the foregoing technical solution, a device in the CA may determine a cipher suite and a secure association key corresponding to the cipher suite that are used for MACsec secure data transmission. In addition, all devices in the CA support the determined cipher suite. In this way, a problem that the cipher suite needs to be re-determined because one or more devices do not support the cipher suite determined by the first device can be avoided.

8 Claims, 5 Drawing Sheets

(51) Int. Cl.
*H04L 29/06* (2006.01)
*H04W 12/0431* (2021.01)
*H04W 12/0433* (2021.01)
*H04W 40/24* (2009.01)
*H04W 80/02* (2009.01)

(52) U.S. Cl.
CPC ............ *H04L 9/0838* (2013.01); *H04L 29/06* (2013.01); *H04L 63/061* (2013.01); *H04L 63/065* (2013.01); *H04L 63/162* (2013.01); *H04W 12/0431* (2021.01); *H04W 12/0433* (2021.01); *H04W 40/24* (2013.01); *H04W 80/02* (2013.01)

(58) Field of Classification Search
CPC ..... H04W 12/04031; H04W 12/04033; H04W 40/24; H04W 80/02
See application file for complete search history.

(56) References Cited

U.S. PATENT DOCUMENTS

| | | | |
|---|---|---|---|
| 2009/0150665 A1 | 6/2009 | Kaippallimalil et al. | |
| 2011/0235802 A1 | 9/2011 | Kokkinen et al. | |
| 2015/0288514 A1 | 10/2015 | Pahl et al. | |

FOREIGN PATENT DOCUMENTS

| | | | |
|---|---|---|---|
| CN | 101141241 A | 3/2008 | |
| CN | 101197662 A | 6/2008 | |
| CN | 101272379 A | 9/2008 | |
| CN | 101282208 A | 10/2008 | |
| CN | 103312495 A | 9/2013 | |
| CN | 103401682 A | 11/2013 | |
| KR | 20120059873 A | 6/2012 | |

OTHER PUBLICATIONS

"IEEE Standard for Local and metropolitan area networks-Port-Based Network Access Control," in IEEE Std 802.1X-2010 (Revision of IEEE Std 802.1X-2004), vol., No., pp. 1-205, Feb. 5, 2010 [online][retrieved on Dec. 28, 2020], Retrieved from: IEEEXplore (Year: 2010).*

IEEE Std 802.IX-2010,IEEE Computer Society,"Local and metropolitanarea networks Port-Based Network Access Control",Feb. 5, 2010,total 222 pages.

IEEE Std 802.1AE-2006, IEEE Standard for Local and metropolitan area networks, Media Access Control (MAC) Security. Aug. 18, 2006. 154 pages.

IEEE Std 802.1AEbw-2013, IEEE Standard for Local and metropolitan area networks—Media Access Control (MAC) Securtiy, Amendment 2:Extended Packet Numbering, Feb. 12, 2013. 67 pages.

IEEE Std 802.1X-2010, IEEE Standard for Local and metropolitan area networks, Port-Based Network Access Control, Feb. 5, 2010. 222 pages.

802.1Xbx-2014, IEEE Standard for Local and metropolitan area networks—Port-Based Network Access Control, Amendment 1: MAC Security Key Agreement Protocol (MKA) Extensions. 2014. 107 pages.

BlackBerry UK Ltd.,"Comparison of options for authorising access to the WLAN", 3GPP TSG-RAN WG Meeting #90, R2-152594, May 25-29, 2015, Fukuoka, Japan, total 4 pages.

* cited by examiner

DATA TRANSMISSION SECURITY PROTECTION METHOD AND NETWORK DEVICE

CROSS-REFERENCE TO RELATED APPLICATIONS

This application is a continuation of International Application No. PCT/CN2017/075617, filed on Mar. 3, 2017, which claims priority to Chinese Patent Application No. 201610679364.6, filed on Aug. 17, 2016. The disclosures of the aforementioned applications are hereby incorporated by reference in their entireties.

TECHNICAL FIELD

Embodiments of this application relate to the field of information technologies, and more specifically, to a data transmission security protection method and a network device.

BACKGROUND

Media Access Control security (English: Media Access Control Security, MACsec for short) defines a secure data communication method based on an Institute of Electrical and Electronics Engineers (English: Institute of Electrical and Electronics Engineers, IEEE for short) 802 local area network. The MACsec can provide a user with a secure service of sending and receiving data at a Media Access Control (English: Media Access Control, MAC for short) layer. The service includes user data encryption, data frame integrity check, and data source authenticity verification.

A connectivity association (English: Connectivity Association, CA for short) may also be referred to as a secure connectivity association (English: Secure Connectivity Association), and is a set of two or more member devices (or referred to as members or participants) using a same secure association key (English: Secure Association Key, SAK for short) and a same cipher suite (English: Cipher Suite). All devices supporting MACsec support a default cipher suite. In addition, each MACsec device may further support more cipher suites. The cipher suites include algorithm parameter option information and algorithms used to perform encryption, decryption, and integrity authentication processing on data. In the CA, there is a member device responsible for determining a cipher suite and a SAK that are used when devices in the CA perform communication. The member device sends the determined cipher suite and SAK to member devices in the CA, so that the member devices in the CA use the cipher suite and the SAK to perform MACsec secure data transmission. However, one or more member devices in the CA may not support the determined cipher suite in some cases. In these cases, the member devices that do not support the cipher suite cannot perform MACsec secure data transmission with another member device. Therefore, how to determine a cipher suite and a SAK that are supported by all member devices in a same CA is an urgent problem to be resolved.

SUMMARY

Embodiments of this application provide a data transmission security protection method and a network device, so that all member devices in a same CA can perform MACsec secure data transmission.

According to a first aspect, an embodiment of this application provides a data transmission security protection method, and the method includes: receiving, by a first member device, a second Extensible Authentication Protocol over local area network-Media Access Control security key agreement EAPOL-MKA packet sent by a second member device, where the second EAPOL-MKA packet includes a second cipher suite list, the second cipher suite list is used to indicate a cipher suite supported by the second member device, and the first member device and the second member device belong to a same connectivity association CA; determining, by the first member device, a first cipher suite, and determining a first secure association key SAK corresponding to the first cipher suite, where the first cipher suite is a cipher suite supported by all member devices in the CA, and the first cipher suite belongs to the cipher suite indicated by the second cipher suite list; and sending, by the first member device, the first cipher suite and the first SAK to the second member device in the CA. Based on the foregoing technical solution, a device in the CA may determine a cipher suite and a secure association key corresponding to the cipher suite that are used for MACsec secure data transmission. In addition, all the devices in the CA support the determined cipher suite. In this way, a problem that the cipher suite needs to be re-determined because one or more devices do not support the cipher suite determined by the first device can be avoided.

With reference to the first aspect, in a first possible implementation of the first aspect, the second EAPOL-MKA packet further includes a key server priority of the second member device, the key server priority is used to negotiate a key server, and before the determining, by the first member device, a first cipher suite, the method further includes: sending, by the first member device, a first EAPOL-MKA packet to the second member device, where the first EAPOL-MKA packet includes a first cipher suite list and a key server priority of the first member device, and the first cipher suite list is used to indicate a cipher suite supported by the first member device; and determining, by the first member device, an identity of the first member device as the key server based on the key server priority of the first member device and the key server priority of the second member device. Based on the foregoing technical solution, information used to determine a key server and information used to determine a cipher suite are carried in one EAPOL-MKA. In this way, after the key server is determined, the key server may determine the required cipher suite.

With reference to the first aspect or the first possible implementation of the first aspect, in a second possible implementation of the first aspect, after the sending, by the first member device, the first cipher suite and the first SAK to the second member device in the CA, the method further includes: determining, by the first member device, that a third member device joins the CA; receiving, by the first member device, a third EAPOL-MKA packet sent by the third member device, where the third EAPOL-MKA packet includes a third cipher suite list, and the third cipher suite list is used to indicate a cipher suite supported by the third member device; determining, by the first member device, a second cipher suite, where the second cipher suite is a cipher suite supported by all the member devices in the CA, and the second cipher suite belongs to a cipher suite indicated by the second cipher suite list and the third cipher suite list; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to the second member device and the third member device in the CA. Based on the foregoing technical solution, after another member device joins the CA, a cipher suite that is appropriate to be used by all the member devices in the CA may also be determined.

With reference to the first aspect or the first possible implementation of the first aspect, in a third possible implementation of the first aspect, after the sending, by the first member device, the first cipher suite and the first SAK to the second member device in the CA, the method further includes: determining, by the first member device, that the second member device exits the CA; determining, by the first member device, a second cipher suite, where the second cipher suite is a cipher suite supported by all the member devices in the CA; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to each member device in the CA. Based on the foregoing technical solution, after a member device exits the CA, a cipher suite that is appropriate to be used by all the member devices in the CA may also be determined.

With reference to the first aspect or the first possible implementation of the first aspect, in a fourth possible implementation of the first aspect, after the sending, by the first member device, the first cipher suite and the first SAK to the second member device in the CA, the method further includes: receiving, by the first member device, a third EAPOL-MKA packet sent by the second member device, where the third EAPOL-MKA packet includes an updated cipher suite list, and the updated cipher suite list is used to indicate a cipher suite supported by the second member device after the second member device updates the cipher suite list; determining, by the first member device, a second cipher suite, where the second cipher suite is a cipher suite supported by all the member devices in the CA, and the second cipher suite belongs to the cipher suite indicated by the updated cipher suite list; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to the second member device in the CA. Based on the foregoing technical solution, after a cipher suite supported by a member device in the CA changes, a cipher suite that is appropriate to be used by all the member devices in the CA may also be determined.

With reference to the first aspect or the first possible implementation of the first aspect, in a fifth possible implementation of the first aspect, after the sending, by the first member device, the first cipher suite and the first SAK to the second member device in the CA, the method further includes: updating, by the first member device, the cipher suite supported by the first member device; determining, by the first member device, a second cipher suite, where the second cipher suite is a cipher suite supported by all the member devices in the CA, and the second cipher suite belongs to a cipher suite updated by the first member device; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to each member device in the CA. Based on the foregoing technical solution, after a cipher suite supported by a member device in the CA changes, a cipher suite that is appropriate to be used by all the member devices in the CA may also be determined.

With reference to any one of the first aspect, or the foregoing possible implementations of the first aspect, in a sixth possible implementation of the first aspect, the method further includes: receiving, by the first member device, a data packet sent by the second member device; determining, by the first member device based on a key indication in the data packet, a target cipher suite and a target SAK corresponding to the target cipher suite that are used to perform integrity check and decryption on the data packet, where the target cipher suite and the target SAK are sent by the first member device; and performing, by the first member device, integrity check and decryption on the data packet by using the target cipher suite and the target SAK. Based on the foregoing technical solution, because a cipher suite and a SAK are in a one-to-one correspondence, the first member device can determine the correct required cipher suite and SAK based on the key indication, and a packet loss caused when a cipher suite is not corresponding to a SAK does not occur.

According to a second aspect, an embodiment of this application provides a data transmission security protection method, and the method includes: sending, by a second member device, a second Extensible Authentication Protocol over local area network-Media Access Control security key agreement EAPOL-MKA packet to a first member device, where the second EAPOL-MKA packet includes a second cipher suite, the second cipher suite is used to indicate a cipher suite supported by the second member device, and the second member device and the first member device are in a same connectivity association CA; receiving, by the second member device, a first cipher suite and a first secure association key SAK that are sent by the first member device, where the first cipher suite belongs to the cipher suite indicated by the second cipher suite list; and performing, by the second member device, MACsec secure data transmission with the first member device by using the first cipher suite and the first SAK. In the foregoing technical solution, a case in which the second member device does not support a cipher suite selected by the first member device can be avoided.

With reference to the second aspect, in a first possible implementation of the second aspect, the second EAPOL-MKA packet further includes a key server priority of the second member device, the key server priority is used to negotiate a key server, and before the receiving, by the second member device, a first cipher suite and the first secure association key SAK that are sent by the first member device, the method further includes: receiving, by the second member device, a first EAPOL-MKA packet sent by the first member device, where the first EAPOL-MKA packet includes a first cipher suite list and a key server priority of the first member device, and the first cipher suite list is used to indicate a cipher suite supported by the first member device; and determining, by the second member device, an identity of the second member device as a member device based on the key server priority of the first member device and the key server priority of the second member device. In the foregoing technical solution, the second member device may determine the identity of the second member device as a member device (namely, not the key server). In addition, the second member device may further obtain the cipher suite supported by the first member device. In this way, if the second member device is selected as the key server, the second member device may determine a required cipher suite and SAK.

With reference to the second aspect or the first possible implementation of the second aspect, in a second possible implementation of the second aspect, the method further includes: receiving, by the second member device, a second cipher suite and a second SAK that are sent by the first member device, where the second cipher suite belongs to the cipher suite indicated by the second cipher suite list, and the second cipher suite and the second SAK are determined by the first member device based on a case in which a new member device joins the CA, or a case in which a member device in the CA exits the CA; and performing, by the second member device, MACsec secure data transmission with the first member device by using the second cipher suite and the second SAK. In the foregoing technical solution, the second member device may receive a cipher suite and a SAK that are updated by the first member device, and the second member device also supports the updated cipher suite and SAK.

With reference to the second aspect or the first possible implementation of the second aspect, in a third possible implementation of the second aspect, the method further includes: sending, by the second member device, a third EAPOL-MKA packet to the first member device, where the third EAPOL-MKA packet includes an updated cipher suite list, and the updated cipher suite list is used to indicate a cipher suite supported by the second member device after the second member device updates the cipher suite list; receiving, by the second member device, a second cipher suite and a second SAK that are sent by the first member device, where the second cipher suite belongs to the cipher suite indicated by the updated cipher suite list; and performing, by the second member device, MACsec secure data transmission with the first member device by using the second cipher suite and the second SAK. In the foregoing technical solution, the second member device may send, to the first member device, an updated cipher suite supported by the second member device, so that the first member device may re-determine, based on the updated cipher suite supported by the second member device, a cipher suite and a SAK that can be used.

According to a third aspect, an embodiment of this application provides a network device. The network device is a first member device, and the network device includes units configured to perform any one of the first aspect or the possible implementations of the first aspect.

According to a fourth aspect, an embodiment of this application provides a network device. The network device is a second member device, and the network device includes units configured to perform any one of the second aspect or the possible implementations of the second aspect.

According to a fifth aspect, an embodiment of this application provides a network device. The network device is a first member device, and the network device includes a transceiver, a processor, and a memory. The processor is configured to execute an instruction stored in the memory, and the instruction stored in the memory can be used to perform any one of the first aspect or the possible implementations of the first aspect.

According to a sixth aspect, an embodiment of this application provides a network device. The network device is a second member device, and the network device includes a transceiver, a processor, and a memory. The processor is configured to execute an instruction stored in the memory, and the instruction stored in the memory can be used to perform any one of the second aspect or the possible implementations of the first aspect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
FIG. 1 is a schematic diagram of a CA.

FIG. 1 is a schematic diagram of a CA. The CA 100 shown in FIG. 2 includes a member device 101 and a member device 102.

Figure 2:
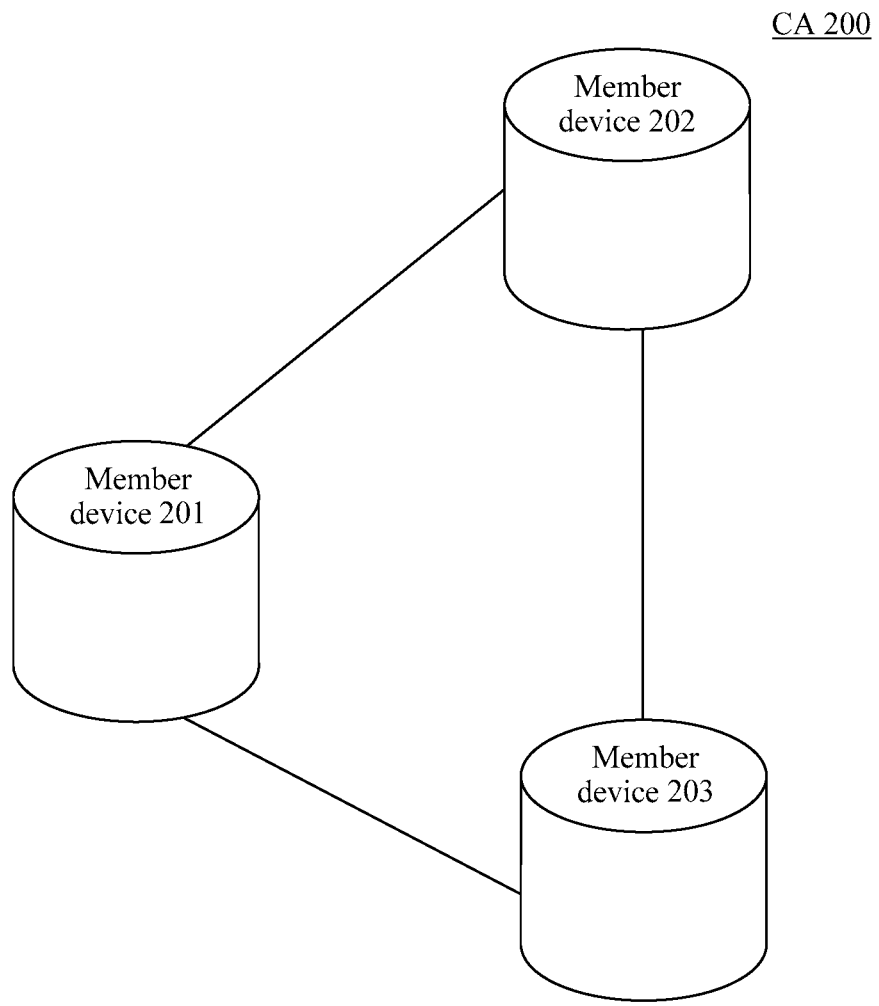
FIG. 2 is a schematic diagram of another CA.

FIG. 2 is a schematic diagram of another CA. The CA 200 shown in FIG. 2 includes a member device 201, a member device 202, and a member device 203.

The following further describes this application with reference to the schematic diagrams of CAs shown in FIG. 1 and FIG. 2.

Figure 3:
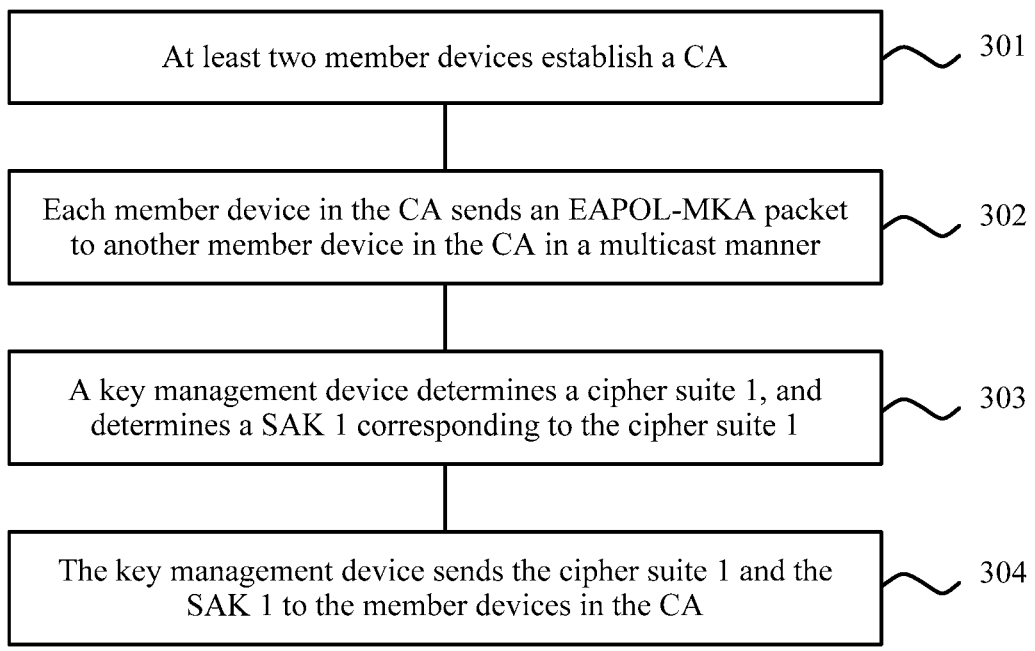
FIG. 3 is a schematic flowchart of a data transmission security protection method according to an embodiment of this application.

FIG. 3 is a schematic flowchart of a data transmission security protection method according to an embodiment of this application.

301. At least two member devices establish a CA.

A process in which the at least two member devices establish the CA is the same as that in the prior art. For example, the CA may be established according to a rule in the Institute of Electrical and Electronics Engineers (English: Institute of Electrical and Electronics Engineers, IEEE for short) 802.1X-2010 standard, and details are not described herein.

For example, as shown in FIG. 1, the member device 101 and the member device 102 establish the CA 100. As shown in FIG. 2, the member device 201, the member device 202, and the member device 203 establish the CA 200.

The member devices in the CA may also be referred to as members, and may be devices such as switches, routers, wireless base stations, or servers.

After the CA is established, the member devices in the CA may negotiate with each other to determine a key server, and the key server determines a cipher suite and a SAK that are used for MACsec secure data transmission. Alternatively, an authentication server in the CA may be responsible for determining a cipher suite and a SAK that are used for MACsec secure data transmission. For details, refer to descriptions in step 302 to step 305.

302. Each member device in the CA sends Extensible Authentication Protocol over local area network (English: Extensible Authentication Protocol (EAP for short) over Local Area Network (LAN for short), EAPOL for short)-Media Access Control security key agreement (English: MACsec Key Agreement, MKA for short) packets to another member devices in the CA in a multicast manner, where the EAPOL-MKA packet includes a cipher suite list, and the cipher suite list is used to indicate a cipher suite supported by each member device.

The Media Access Control security key agreement may also be referred to as a Media Access Control security key agreement protocol (English: MACsec Key Agreement Protocol).

It may be understood that, the another member device is all member devices in the CA other than the each member device.

In an example in which the CA 100 shown in FIG. 1 is used, because the CA 100 includes only the member device 101 and the member device 102, for the member device 101, the another member device is the member device 102; and for the member device 102, the another member device is the member device 101. In other words, step 302 may include: the member device 101 in the CA 100 may send an EAPOL-MKA packet 101 to the member device 102, where the EAPOL-MKA packet 101 includes a cipher suite list 101, and the cipher suite list 101 is used to indicate a cipher suite supported by the member device 101; and the member device 102 may send an EAPOL-MKA packet 102 to the member device 101, where the EAPOL-MKA packet 102 includes a cipher suite list 102, and the cipher suite list 102 is used to indicate a cipher suite supported by the member device 102.

In an example in which the CA 200 shown in FIG. 2 is used, because the CA 200 includes the member device 201, the member device 202, and the member device 203, for the member device 201, the another member device is the member device 202 and the member device 203; for the member device 202, the another member device is the member device 201 and the member device 203; and for the member device 203, the another member device is the member device 201 and the member device 203. In other words, step 302 may include: the member device 201 may send EAPOL-MKA packets 201 to the member device 202 and the member device 203 in a multicast manner, where the EAPOL-MKA packets 201 includes a cipher suite list 201, and the cipher suite list 201 is used to indicate a cipher suite supported by the member device 201; the member device 202 may send EAPOL-MKA packets 202 to the member device 201 and the member device 203 in a multicast manner, where the EAPOL-MKA packets 202 includes a cipher suite list 202, and the cipher suite list 202 is used to indicate a cipher suite supported by the member device 202; and the member device 203 may send EAPOL-MKA packets 203 to the member device 201 and the member device 202 in a multicast manner, where the EAPOL-MKA packets 203 includes a cipher suite list 203, and the cipher suite list 203 is used to indicate a cipher suite supported by the member device 203.

The cipher suite list that is carried in the EAPOL-MKA packet and that is used to indicate the cipher suite supported by the member device may include a corresponding identifier (English: Identifier, ID for short) of the cipher suite supported by the member device, or the cipher suite list may include corresponding specific content of the cipher suite supported by the device. This is not specifically limited in this embodiment of this application, provided that the cipher suite list can indicate the cipher suite supported by the corresponding device.

A sequence of sending, by each member device in the CA, the EAPOL-MKA packet carrying the cipher suite list is not specifically limited either. In an example in which the CA 100 shown in FIG. 1 is used, in some embodiments, the member device 101 may first send the EAPOL-MKA packet 101 to the member device 102, and then the member device 102 sends the EAPOL-MKA packet 102 to the member device 101. In some other embodiments, the member device 102 may first send the EAPOL-MKA packet 102 to the member device 101, and then the member device 101 sends the EAPOL-MKA packet 101 to the member device 102. In some other embodiments, the member device 101 and the member device 102 may simultaneously send respective EAPOL-MKA packets to a peer end.

It may be understood that, because each member device in the CA sends the EAPOL-MKA packet to the another member device in the CA, each member device in the CA correspondingly receives an EAPOL-MKA packet sent by the another member device in the CA. In an example in which the CA 100 shown in FIG. 1 is used, the member device 101 may receive the EAPOL-MKA packet 102 sent by the member device 102. The member device 102 may receive the EAPOL-MKA packet 101 sent by the member device 101. In an example in which the CA 200 shown in FIG. 2 is used, the member device 201 may separately receive the EAPOL-MKA packet 202 sent by the member device 202 and the EAPOL-MKA packet 203 sent by the member device 203, the member device 202 may separately receive the EAPOL-MKA packet 201 sent by the member device 201 and the EAPOL-MKA packet 203 sent by the member device 203, and the member device 203 may separately receive the EAPOL-MKA packet 201 sent by the member device 201 and the EAPOL-MKA packet 202 sent by the member device 202.

Because the sequence of sending, by each member device in the CA, the EAPOL-MKA packet carrying the cipher suite list may not be determined, in some cases, some member devices in the CA may first receive EAPOL-MKA packets, and then send EAPOL-MKA packets. In an example in which the CA 100 shown in FIG. 1 is used, the member device 102 may first receive the EAPOL-MKA packet 101 sent by the member device 101, and then send the EAPOL-MKA packet 102 to the member device 101.

Optionally, in some embodiments, each member device in the CA may further send respective identity information to another device in the CA. The identity information may be a random number of 96 bits (English: bit) that is specified in IEEE 802.1X-2010. The random number of 96 bits may be generated by using a strong random number generation algorithm that meets a specific requirement. The identity information of each device and the cipher suite list may be sent, together with other information by using specified type-length-values (English: type-length-value, TLV for short), to all the member devices in the CA 100 in a multicast manner by using the EAPOL-MKA packets. For example, the specified TLV used to carry the cipher suite list may be an announcement parameter set (English: announcement parameter set) TLV, a MACsec cipher suite (English: MACsec Cipher Suites) list TLV, or the like. The specified TLV used to carry the identity information of the device may be a basic parameter set (English: basic parameter set) TLV. In addition to the identity information of the device, the basic parameter set TLV may further carry a sequence number of the EAPOL-MKA packet. Certainly, the identity information may not be sent to the another device together with the cipher suite list, but be sent to the another device by using another EAPOL-MKA packet.

Optionally, in some embodiments, after receiving a cipher suite list sent by another member device, each member device in the CA may further send feedback information to the member device sending the cipher suite list. The feedback information is used to indicate that each member device successfully receives the cipher suite list. After receiving the feedback information, the member device sending the cipher suite list may determine that the member device sending the feedback information successfully receives the cipher suite list.

The feedback information may be carried in an EAPOL-MKA packet. The EAPOL-MKA packet carrying the feedback information is a next EAPOL-MKA packet that needs to be sent. In some embodiments, the next EAPOL-MKA packet that needs to be sent may be an EAPOL-MKA packet carrying a cipher suite list. In some embodiments, the next EAPOL-MKA packet may be an EAPOL-MKA packet carrying no cipher suite list. In an example in which the CA 100 shown in FIG. 1 is used, the member device 101 sends, to the member device 102, the EAPOL-MKA packet 101 carrying the cipher suite list 101. After receiving the EAPOL-MKA packet 101, the member device 102 may send the EAPOL-MKA packet 102 to the member device 101. In addition to the cipher suite list 102, the EAPOL-MKA packet 102 may further carry the feedback information. After receiving the EAPOL-MKA packet 102, the member device 101 may send, to the member device 102, an EAPOL-MKA packet carrying feedback information. In some embodiments, the EAPOL-MKA packet may carry the feedback information but not carry the cipher suite list used to indicate the cipher suite supported by the member device 101. In some other embodiments, each EAPOL-MKA packet sent by each member device in the CA may carry a cipher suite list used to indicate a cipher suite supported by the member device. In this way, it may be convenient for a member device in the CA to determine a cipher suite currently supported by another member device. That is, in some embodiments, the EAPOL-MKA packet may include the feedback information and the cipher suite list used to indicate the cipher suite supported by the member device 101.

In some embodiments, the feedback information may be identity information of a cipher suite list sender and a sequence number of the EAPOL-MKA packet. In an example in which the CA 100 shown in FIG. 1 is used, the EAPOL-MKA packet 101 includes identity information of the member device 101 and a sequence number of the EAPOL-MKA packet 101. In this case, after receiving the EAPOL-MKA packet 101, the member device 102 may add, in groups to a potential peer list (English: potential peer list) or a live peer list (English: live peer list), the identity information of the member device 101 and the sequence number of the EAPOL-MKA packet 101 that are in a basic parameter set TLV in the EAPOL-MKA packet 101. The EAPOL-MKA packet 102 sent by the member device 102 may carry the potential peer list or the live peer list. In this way, after receiving the EAPOL-MKA packet 102, the member device 101 may determine whether the potential peer list or the live peer list includes the identity information of the member device 101 and the sequence number of the EAPOL-MKA packet 101. If the identity information of the member device 101 and the sequence number of the EAPOL-MKA packet 101 exist in the potential peer list or the live peer list, the member device 101 may determine that the member device 102 successfully receives the EAPOL-MKA packet 101. If the identity information of the member device 101 and the sequence number of the EAPOL-MKA packet 101 do not exist in the potential peer list or the live peer list, the member device 101 may determine that the member device 102 does not successfully receive the EAPOL-MKA packet 101. The EAPOL-MKA packet 102 may further include identity information of the member device 102 and a sequence number of the EAPOL-MKA packet 102. The member device 101 may add, in groups to a potential peer list or a live peer list, the identity information of the member device 102 and the sequence number of the EAPOL-MKA packet 102 that are in a basic parameter set TLV in the EAPOL-MKA packet 102, and send, to the member device 102, the EAPOL-MKA packet carrying the potential peer list or the live peer list.

It may be understood that, if the CA includes at least two member devices, provided that a member device in the CA receives an EAPOL-MKA packet that is sent by another member device and that carries a cipher suite list, the member device adds identity information of the another member device and the sequence number of the EAPOL-MKA packet in groups to a potential peer list or a live peer list. In other words, the potential peer list or the live peer list may include a plurality of groups including identity information of member devices and sequence numbers of EAPOL-MKA packets. In an example in which the CA 200 shown in FIG. 2 is used, the member device 202 receives the EAPOL-MKA packet 201 sent by the member device 201 and the EAPOL-MKA packet 203 sent by the member device 203, and each EAPOL-MKA packet carries identity information of a member device and a sequence number of the EAPOL-MKA packet. In this case, the member device 202 may add identity information of the member device 201 and a sequence number of the EAPOL-MKA packet 201 in groups to a potential peer list or a live peer list, and may further add identity information of the member device 203 and a sequence number of the EAPOL-MKA packet 203 in groups to the potential peer list or the live peer list. The member device 202 may send the potential peer list or the live peer list to the member device 201 and the member device 203 by using an EAPOL-MKA packet. The member device 201 may determine whether the potential peer list or the live peer list includes the identity information of the member device 201 and the sequence number of the EAPOL-MKA packet 201, and if the potential peer list or the live peer list includes the identity information of the member device 201 and the sequence number of the EAPOL-MKA packet 201, determine that the member device 202 successfully receives the EAPOL-MKA packet 201, or if the potential peer list or the live peer list does not include the identity information of the member device 201 or the sequence number of the EAPOL-MKA packet 201, determine that the member device 202 does not receive the EAPOL-MKA packet 201. Similarly, the member device 203 may determine whether the potential peer list or the live peer list includes the identity information of the member device 203 and the sequence number of the EAPOL-MKA packet 203, and if the potential peer list or the live peer list includes the identity information of the member device 203 and the sequence number of the EAPOL-MKA packet 203, determine that the member device 202 successfully receives the EAPOL-MKA packet 203, or if the potential peer list or the live peer list does not include the identity information of the member device 203 or the sequence number of the EAPOL-MKA packet 203, determine that the member device 202 does not receive the EAPOL-MKA packet 203.

Certainly, the feedback information may also be information in another form. For example, the feedback information may be simple binary information. If each member device determines that a value of the feedback information is 0, the member device may determine that a corresponding member device does not successfully receive a cipher suite list sent by the member device. If each member device determines that a value of the feedback information is 1, the member device may determine that a corresponding member device successfully receives a cipher suite list sent by the member device.

303. A key management device determines a cipher suite 1, and determines a SAK 1 corresponding to the cipher suite 1, where all member devices in the CA support the cipher suite 1.

In some embodiments, the key management device may be an authentication server. In some other embodiments, the key management device may be a key server. Specifically, MACsec has two typical networking modes: a host-oriented mode and a device-oriented mode. In the host-oriented mode, there is an authentication server, and the authentication server is responsible for determining and sending a cipher suite and a SAK. In the device-oriented mode, a member device in the CA is selected as a key server, and the key server is responsible for determining and sending a cipher suite and a SAK. In other words, if a MACsec networking mode is the host-oriented mode, the key management device is an authentication server; or if a MACsec networking mode is the device-oriented mode, the key management device is a member device selected as a key server.

A manner for determining the key server in the device-oriented mode in this embodiment of this application may be the same as a manner for determining a key server in the prior art (such as the IEEE 802.1X-2010 standard).

Specifically, in some embodiments, if the CA includes only two member devices, an Extensible Authentication Protocol (English: Extensible Authentication Protocol, EAP for short) authenticator (English: authenticator) device may be selected as the key server.

In some other embodiments, the key server may be determined based on a priority of each member device in the CA. Specifically, each member device in the CA may set a key server priority (English: key server priority) used to select the key server. A smaller key server priority value leads to a higher priority of a corresponding member device. The key server priority may be carried in an EAPOL-MKA packet. Optionally, in some embodiments, a first EAPOL-MKA packet sent by each member device in the CA carries the key server priority, and the first EAPOL-MKA packet also carries a cipher suite list used to indicate a cipher suite supported by each member device. In this way, after a member device selected as the key server determines an identity of the member device as the key server, the member device may determine a required cipher suite without waiting to receive an EAPOL-MKA packet sent next time. In addition, a member device that is not selected as the key server may determine an identity of the member device as a member device.

In an example in which the CA 100 shown in FIG. 1 is used, if the CA 100 uses MACsec in the device-oriented mode, and a priority of the member device 101 is the highest, the member device 101 may determine an identity of the member device 101 as the key server based on a key server priority of the member device 101 and a key server priority of the member device 102. In this case, the member device 101 may determine the cipher suite 1, and determine the SAK 1 corresponding to the cipher suite 1. In addition, the member device 102 may determine an identity of the member device 102 as a member device (namely, not the key server) based on the key server priority of the member device 102 and the key server priority of the member device 101.

If key server priority values of a plurality of member devices are the same, a member device with a smallest value of a secure channel identifier (English: Secure Channel Identifier, SCI for short) is selected as the key server. The SCI and the key server priority may be carried in a same EAPOL-MKA packet.

Each member device in the CA may obtain a key server priority and an SCI of the member device, and a cipher suite supported by the member device. In addition, time of sending EAPOL-MKA packets by all the member devices in the CA may be in order of priority. Therefore, in some embodiments, after receiving an EAPOL-MKA packet sent by another member device, based on a key server priority and a cipher suite list in the received EAPOL-MKA packet, a member device in the CA may determine the member device as the key server, and determine a required cipher suite and a corresponding SAK. Then, the member device serving as the key server may also send, to another device in the CA, an EAPOL-MKA packet carrying a key server priority and a cipher suite list of the member device.

In an example in which the CA 100 shown in FIG. 1 is used, if the key server priority of the member device 101 is higher than the key server priority of the member device 102, in this case, the member device 101 may receive the EAPOL-MKA packet 102 sent by the member device 102, and the EAPOL-MKA packet 102 carries the key server priority and the cipher suite list 102 of the member device 102. The member device 101 may determine an identity of the member device 101 as the key server based on the key server priority of the member device 101 and the key server priority of the member device 102. Then, the member device 101 may determine the cipher suite 1 and the corresponding SAK 1 based on the cipher suite list 102 and the cipher suite supported by the member device 101. Subsequently, the member device 101 may send the EAPOL-MKA packet 101 to the member device 102, and the EAPOL-MKA packet 101 may carry the key server priority and the cipher suite list 101 of the member device 101.

Optionally, in some embodiments, there may be a plurality of cipher suites supported by all the member devices in the CA. For ease of description, a cipher suite supported by all the devices in the CA may be referred to as a public cipher suite. In this case, the key management device may select, as the cipher suite 1, a public cipher suite with a highest priority in the plurality of public cipher suites. Certainly, the key management device may first determine a public cipher suite set, and the public cipher suite set includes all public cipher suites. Then, the key management device determines, as the cipher suite 1, a public cipher suite with a highest priority in the public cipher suite set. Alternatively, the key management device may first determine a cipher suite with a highest priority in obtained cipher suites, and then determine whether the cipher suite with the highest priority is a cipher suite supported by all the member devices. If the cipher suite with the highest priority is a cipher suite supported by all the member devices, the key management device determines the cipher suite as the cipher suite 1. If the cipher suite with the highest priority is not a cipher suite supported by all the member devices, the key management device continues to determine a cipher suite with a highest priority other than the cipher suite, and continues to determine whether the newly determined cipher suite is supported by all the member devices, by analogy, until the key management device determines a cipher suite that is supported by all the member devices and that has a highest priority, and determines the cipher suite as the cipher suite 1.

A priority of a cipher suite may be determined according to a preset rule, provided that this rule can reflect different features of different cipher suites, and priorities of the different cipher suites can be distinguished based on the features.

For example, security strength may be used as a priority of a cipher suite, and higher security strength of a cipher suite leads to a higher priority of the cipher suite. Specifically, the key management device may determine security strength of each of the plurality of public cipher suites, and select, as the cipher suite 1, a public cipher suite with highest security strength.

For another example, a priority of a cipher suite may be determined based on security strength of the cipher suite and other information (such as performance of the key management device, performance of a member device with lowest performance in the CA, or power consumption of the cipher suite). A rule for determining the priority of the cipher suite by the key management device with reference to the security strength and the other information may be pre-stored in the key management device, or may be obtained from another device. This is not limited in this embodiment of this application. For example, the key management device may determine security strength and power consumption of each of the plurality of public cipher suites. The key management device may select, as the cipher suite 1 according to a preset rule, a public cipher suite with a highest priority, and the cipher suite 1 has relatively high security strength and relatively low power consumption. It may be understood that, the cipher suite 1 needs only to be a secure suite that is determined according to the rule and that has a highest priority. The security strength of the cipher suite 1 may not be the highest, and the power consumption of the cipher suite 1 may not be the lowest.

Optionally, in some embodiments, priorities of at least two of the plurality of public cipher suites may be the same, and the priorities of the at least two public cipher suites are higher than a priority of another public cipher suite. In this case, one of the public cipher suites may be randomly selected as the cipher suite 1, or one of the public cipher suites may be selected as the cipher suite 1 according to a preset rule. For example, if the priorities of the cipher suites are security strength of the cipher suites, when two public cipher suites have same security strength, a public cipher suite with lower power consumption may be selected as the cipher suite 1.

Determining of the SAK 1 does not depend on content of the cipher suite 1, provided that a secure association key and a SAK are ensured to be in a one-to-one correspondence. For example, the key management device may first determine the SAK 1, and then determine the cipher suite 1.

304. The key management device sends the cipher suite 1 and the SAK 1 to the member devices in the CA.

Specifically, the key management device may send the cipher suite 1 and the SAK 1 to the member devices in the CA by using a distributed SAK parameter set (English: distributed SAK parameter set) TLV in an EAPOL-MKA packet. Certainly, it may be understood that, because the cipher suite 1 is a cipher suite supported by all the member devices in the CA, each member device in the CA can determine the content of the cipher suite 1. Therefore, the key management device may not directly send the specific content of the cipher suite 1, but send an indication message (such as an ID of the cipher suite 1) used to indicate the cipher suite 1. In this way, each member device in the CA may determine, based on the indication message, the cipher suite selected by the key management device. However, because the SAK 1 is determined by the key management device, the key management device still needs to send the SAK 1 to each member device in the CA.

After the cipher suite 1 and the SAK 1 are determined to be used to perform MACsec secure data transmission, when some events occur, a cipher suite and a SAK that are used when MACsec secure data transmission is performed between devices in the CA may need to be re-determined. For example, in an event 1, at least one member device newly joins the CA. In an event 2, at least one member device in the CA exits the CA. In an event 3, a cipher suite supported by at least one member device in the CA is updated. Certainly, there may further be another event in which a cipher suite and a secure association key that are used when MACsec secure data transmission is performed between member devices in the CA need to be re-determined. The following separately describes the events. It may be understood that, when at least one member device exits the CA, the CA should still include at least two member devices. Further, it may be understood that, one or more of the foregoing three events may occur at the same time. Herein, "occurring at the same time" may be occurring in a same time period, and may not be occurring at a same moment. For example, in a time period, at least one device in the CA exits the CA, and a cipher suite supported by at least one device that does not exit the CA is updated. For another example, in a time period, at least one device in the CA exits the CA, another device or other devices join the CA, and a cipher suite supported by at least one device that does not exit the CA is updated.

When at least one member device newly joins the CA (namely, the event 1 occurs), for a specific process of re-determining a cipher suite and a SAK that are used to perform MACsec secure data transmission, refer to descriptions in step 305 to step 309. It may be understood that, in a process from step 305 to step 309, another event that may cause a need to re-determine a cipher suite and a SAK does not occur.

305. At least one member device joins the CA.

A process in which the at least one member device joins the CA is the same as that in the prior art. For example, the at least one member device may join the CA according to a rule in the IEEE 802.1X-2010 standard, and details are not described herein.

306. Each member device in the CA sends EAPOL-MKA packets to another member device in the CA in a multicast manner, where the EAPOL-MKA packet includes a cipher suite list, and the cipher suite list is used to indicate a cipher suite supported by each member device.

Step 306 is similar to step 302, while the member device newly joining the CA is added to a sending object of each member device, and the member device newly joining the CA is added to a device sending an EAPOL-MKA packet.

In an example in which the CA 100 shown in FIG. 1 is used, it is assumed that a member device 103 joins the CA 100. In this case, the member device 101 may send the EAPOL-MKA packets 101 to the member device 102 and the member device 103 in a multicast manner, where the EAPOL-MKA packet 101 includes the cipher suite list 101, and the cipher suite list 101 is used to indicate the cipher suite supported by the member device 101; the member device 102 may send the EAPOL-MKA packets 102 to the member device 101 and the member device 103 in a multicast manner, where the EAPOL-MKA packet 102 includes the cipher suite list 102, and the cipher suite list 102 is used to indicate the cipher suite supported by the member device 102; and the member device 103 may send an EAPOL-MKA packets 103 to the member device 101 and the member device 102 in a multicast manner, where the EAPOL-MKA packet 103 includes a cipher suite list 103, and the cipher suite list 103 is used to indicate a cipher suite supported by the member device 103.

In an example in which the CA 200 shown in FIG. 2 is used, it is assumed that a member device 204 joins the CA 200. In this case, the member device 201 may send the EAPOL-MKA packets 201 to the member device 202, the member device 203, and the member device 204 in a multicast manner, where the EAPOL-MKA packet 201 includes the cipher suite list 201, and the cipher suite list 201 is used to indicate the cipher suite supported by the member device 201; the member device 202 may send the EAPOL-MKA packets 202 to the member device 201, the member device 203, and the member device 204 in a multicast manner, where the EAPOL-MKA packet 202 includes the cipher suite list 202, and the cipher suite list 202 is used to indicate the cipher suite supported by the member device 202; the member device 203 may send the EAPOL-MKA packets 203 to the member device 201, the member device 202, and the member device 204 in a multicast manner, where the EAPOL-MKA packet 203 includes the cipher suite list 203, and the cipher suite list 203 is used to indicate the cipher suite supported by the member device 203; and the member device 204 may send an EAPOL-MKA packets 204 to the member device 201, the member device 202, and the member device 203 in a multicast manner, where the EAPOL-MKA packet 204 includes a cipher suite list 204, and the cipher suite list 204 is used to indicate a cipher suite supported by the member device 204.

In addition, an original member device in the CA determines, based on identity information carried in a received EAPOL-MKA packet, whether a member device sending the EAPOL-MKA packet is the member device newly joining the CA.

In an example in which the CA 100 shown in FIG. 1 is used, if the member device 101 determines, based on identity information in the EAPOL-MKA packet 103 sent by the member device 103, that the identity information of the member device 103 is not in a potential peer list or a live peer list stored by the member device 101, the member device 101 may determine that the member device 103 is a member device newly joining the CA 100.

307. The key management device determines a cipher suite 2, where all the member devices in the CA support the cipher suite 2.

The new member device is added to the CA, and therefore, in some embodiments, a priority of a member device in the new member device may be higher than a priority of another member device. In this case, the key management device may be re-determined as a newly joined member device. A specific process of determining the key management device is the same as the foregoing process of determining the key management device, and details are not described herein again. In some other embodiments, priorities of all new member devices may be lower than that of the original key management device. In this case, the identity of the member device serving as the key management device may not change.

Similar to the cipher suite 1, the cipher suite 2 may also be a public cipher suite with a highest priority in a plurality of public cipher suites.

308. When determining that the cipher suite 2 is different from a currently used cipher suite, the key management device determines a SAK 2 corresponding to the cipher suite 2.

309. The key management device sends the cipher suite 2 and the SAK 2 to the member devices in the CA.

A specific process of sending, by the key management device, the cipher suite 2 and the SAK 2 to the member devices in the CA is similar to the specific process of sending, by the key management device, the cipher suite 1 and the SAK 1 to the member devices in the CA, and details are not described herein again.

If the key management device determines that the cipher suite 2 is the same as the currently used cipher suite, the key management device may directly send the currently used cipher suite and a corresponding SAK to the member device newly joining the CA. For a specific sending process, refer to step 304.

If step 305 to step 309 are performed after step 304, the currently used cipher suite is the cipher suite 1. In this case, when determining that the cipher suite 2 is different from the cipher suite 1, the key management device may determine the SAK 2 corresponding to the cipher suite 2. When determining that the cipher suite 2 is the same as the cipher suite 1, the key management device may directly send the cipher suite 1 and the SAK 1 to the member device newly joining the CA.

A specific process of determining, by the key management device, the SAK 2 corresponding to the cipher suite 2 is similar to the specific process of determining the SAK 1 corresponding to the cipher suite 1, and details are not described herein.

In addition, in some embodiments, the key management device may directly determine the SAK 2 corresponding to the cipher suite 2 without determining whether the cipher suite 2 is the same as the cipher suite 1. In this way, the cipher suite 2 may be the same as the cipher suite 1, or the cipher suite 2 may be different from the cipher suite 1. Regardless of whether the cipher suite 1 is the same as the cipher suite 2, the key management device may send the cipher suite 2 and the SAK 2 to each member device in the CA. In this case, if the cipher suite 1 is the same as the cipher suite 2, there may be a case in which one cipher suite is corresponding to two SAKs.

When at least one member device in the CA exits the CA (namely, the event 2 occurs), for a specific process of re-determining a cipher suite and a SAK that are used to perform MACsec secure data transmission, refer to descriptions in step 310 to step 313. Similarly, in a process from step 310 to step 313, another event that may cause a need to re-determine a cipher suite and a SAK does not occur.

310. At least one member device exits the CA.

A specific process in which the at least one member exits the CA may be the same as a process in the prior art, and details are not described herein. However, it may be understood that, after the at least one member device exits the CA, the CA still includes at least two member devices.

A member device in the CA may determine, based on a life time (English: life time), whether a member device exits the CA. Specifically, if a member device does not receive, in a specific lifetime, a packet sent by another member device, the member device may determine that the another member device exits the CA.

311. The key management device determines a cipher suite 3, where all the member devices in the CA support the cipher suite 3.

In some embodiments, the member device serving as the key management device may exit the CA, or a priority of a member device that does not exit the CA changes. In these cases, the key management device may be re-determined. A specific process of determining the key management device is the same as the foregoing process of determining the key management device, and details are not described herein again. In some other embodiments, the member device serving as the key management device may not exit the CA, and a priority of a member device that does not exit the CA does not change. In this case, the key management device does not need to be re-determined.

Similar to the cipher suite 1, the cipher suite 3 may also be a public cipher suite with a highest priority in a plurality of public cipher suites.

In an example in which the CA 200 shown in FIG. 2 is used, it is assumed that the member device 202 exits the CA, and the member device 201 is the key server. In this case, the member device 201 may determine that the cipher suite 3 belongs to a cipher suite indicated by the cipher suite list 201 and the cipher suite list 203, and the cipher suite 3 is a cipher suite with a highest priority in the cipher suite indicated by the cipher suite list 201 and the cipher suite list 203.

312. When determining that the cipher suite 3 is different from a currently used cipher suite, the key management device determines a SAK 3 corresponding to the cipher suite 3.

If the key management device determines that the cipher suite 2 is the same as the currently used cipher suite, the key management device may not need to re-send a cipher suite and a corresponding SAK.

If step 310 to step 313 are performed after step 309, the currently used cipher suite is the cipher suite 2. In this case, when determining that the cipher suite 3 is different from the cipher suite 2, the key management device may determine the SAK 3 corresponding to the cipher suite 3.

Similarly, if step 310 to step 313 are performed after step 304, the currently used cipher suite is the cipher suite 1. In this case, when determining that the cipher suite 3 is different from the cipher suite 1, the key management device may determine the SAK 3 corresponding to the cipher suite 3.

A specific process of determining, by the key management device, the SAK 3 corresponding to the cipher suite 3 is similar to the specific process of determining the SAK 1 corresponding to the cipher suite 1, and details are not described herein.

313. The key management device sends the cipher suite 3 and the SAK 3 to the member devices in the CA.

A specific process of sending, by the key management device, the cipher suite 3 and the SAK 3 to the member devices in the CA is similar to the specific process of sending, by the key management device, the cipher suite 1 and the SAK 1 to the member devices in the CA, and details are not described herein again.

In addition, in some embodiments, the key management device may directly determine the SAK 3 corresponding to the cipher suite 3 without determining whether the cipher suite 3 is the same as the cipher suite 1. In this way, the cipher suite 3 may be the same as the cipher suite 1, or the cipher suite 3 may be different from the cipher suite 1. Regardless of whether the cipher suite 1 is the same as the cipher suite 3, the key management device may send the cipher suite 3 and the SAK 3 to each member device in the CA. In this case, if the cipher suite 1 is the same as the cipher suite 3, there may be a case in which one cipher suite is corresponding to two SAKs.

When a cipher suite supported by at least one member device in the CA is updated (namely, the event 3 occurs), for a specific process of re-determining a cipher suite and a SAK that are used to perform MACsec secure data transmission, refer to descriptions in step 314 to step 317. Similarly to the foregoing embodiments, in a process from step 314 to step 317, another event that may cause a need to re-determine a cipher suite and a SAK does not occur.

314. If a cipher suite supported by at least one member device is updated, each of the at least one member device sends an EAPOL-MKA packet to another member device in the CA, where the EAPOL-MKA packet includes a cipher suite list used to indicate an updated supported cipher suite.

In an example in which the CA 100 shown in FIG. 1 is used, if the cipher suite supported by the member device 102 is updated, the member device 102 may send an EAPOL-MKA packet 102' to the member device 101. The EAPOL-MKA packet 102' includes a cipher suite list 102', and the cipher suite list 102' is used to indicate an updated cipher suite supported by the member 102.

In an example in which the CA 200 shown in FIG. 2 is used, if the cipher suite supported by the member device 201 and the cipher suite supported by the member device 203 are updated, the member device 201 may send an EAPOL-MKA packet 201' to the member device 202 and the member device 203, where the EAPOL-MKA packet 201' includes a cipher suite list 201', and the cipher suite list 201' includes an updated cipher suite supported by the member device 201; and the member device 203 may send an EAPOL-MKA packet 203' to the member device 201 and the member device 202, where the EAPOL-MKA packet 203' includes a cipher suite list 203', and the cipher suite list 203' includes an updated cipher suite updated by the member device 203.

A specific process of sending, by the member device, the EAPOL-MKA packet in step 314 is similar to the specific process of sending, by the member device, the EAPOL-MKA packet in step 302, and details are not described herein again. For example, the EAPOL-MKA packet in step 314 may also carry identity information of the member device sending the EAPOL-MKA packet and a sequence number of the EAPOL-MKA packet. A member device receiving the EAPOL-MKA packet may also send feedback information. A difference between step 314 and step 302 is that the member device sending the EAPOL-MKA packet in step 314 may be only a member device updating a supported cipher suite, and content indicated by the cipher suite list carried in the EAPOL-MKA packet may be different. For example, in some embodiments, the cipher suite list that is carried in the EAPOL-MKA packet in step 314 and that is used to indicate the updated supported cipher suite may include all cipher suites currently supported by the member device sending the cipher suite list. In some other embodiments, the cipher suite list that is carried in the EAPOL-MKA packet in step 314 and that is used to indicate the updated supported cipher suite may indicate a changed cipher suite in the cipher suite list updated by the member device sending the cipher suite list. For example, the cipher suite list may indicate a cipher suite that is no longer supported and/or a newly added supported cipher suite.

In addition, an identity of the member device updating a cipher suite may be the key management device, or may not be the key management device.

315. The key management device determines a cipher suite 4, where all the member devices in the CA support the cipher suite 4.

Similar to the cipher suite 1, the cipher suite 2 may also be a public cipher suite with a highest priority in a plurality of public cipher suites.

316. When determining that the cipher suite 4 is different from a currently used cipher suite, the key management device determines a SAK 4 corresponding to the cipher suite 4.

If the key management device determines that the cipher suite 4 is the same as the currently used cipher suite, the key management device may not send a cipher suite and a corresponding SAK to the member devices in the CA.

If step 314 to step 317 are performed after step 304, the currently used cipher suite is the cipher suite 1. In this case, when determining that the cipher suite 4 is different from the cipher suite 1, the key management device may determine the SAK 4 corresponding to the cipher suite 4.

Similarly, if step 314 to step 317 are performed after step 309, the currently used cipher suite is the cipher suite 2. In this case, when determining that the cipher suite 4 is different from the cipher suite 2, the key management device may determine the SAK 4 corresponding to the cipher suite 4.

Similarly, if step 314 to step 317 are performed after step 313, the currently used cipher suite is the cipher suite 3. In this case, when determining that the cipher suite 4 is different from the cipher suite 3, the key management device may determine the SAK 4 corresponding to the cipher suite 4.

A specific process of determining, by the key management device, the SAK 4 corresponding to the cipher suite 4 is similar to the specific process of determining the SAK 1 corresponding to the cipher suite 1, and details are not described herein.

In addition, in some embodiments, the key management device may directly determine the SAK 4 corresponding to the cipher suite 4 without determining whether the cipher suite 4 is the same as the cipher suite 1. In this way, the cipher suite 4 may be the same as the cipher suite 1, or the cipher suite 4 may be different from the cipher suite 1. Regardless of whether the cipher suite 1 is the same as the cipher suite 4, the key management device may send the cipher suite 4 and the SAK 2 to each member device in the CA. In this case, if the cipher suite 1 is the same as the cipher suite 4, there may be a case in which one cipher suite is corresponding to two SAKs.

317. The key management device sends the cipher suite 4 and the SAK 4 to the member devices in the CA.

A specific process of sending, by the key management device, the cipher suite 4 and the SAK 4 to the member devices in the CA is similar to the specific process of sending, by the key management device, the cipher suite 1 and the SAK 1 to the member devices in the CA, and details are not described herein again.

In the foregoing embodiment, that two cipher suites are the same means that algorithms of the two cipher suites are the same, and parameters, for example, whether encryption is supported and a supported confidentiality offset (English: confidentiality offset), related to the algorithms are also the same.

After a cipher suite and a corresponding SAK are sent, a member device in the CA may use the sent cipher suite and SAK to perform MACsec secure data transmission.

After the cipher suite that can be used and the corresponding SAK are determined, a member device in the CA may perform, by using the determined cipher suite and the corresponding SAK, integrity processing and encryption on data that needs to be sent, and add a key indication to a sent data packet. The key indication is used to indicate the SAK used by the member device. In this way, after receiving the data packet, a member device receiving the data packet may determine, based on the key indication, the target SAK used by the transmit end member device, and determine, based on a correspondence between the SAK and the cipher suite, the target cipher suite used by the transmit end member device. The receive end device may perform integrity check and decryption on the received data packet based on the target SAK and the target cipher suite.

In an example in which the CA 100 shown in FIG. 1 is used, it is assumed that the member device 101 sends the cipher suite 1 and the SAK 1 to the member device 102. When sending data to the member device 102, the member device 101 may perform integrity processing and encryption on the data by using the cipher suite 1 and the SAK 1. In addition, when the member device 101 sends the data to the member device 102, the data carries a key indication, and the key indication is used to indicate the SAK 1. For example, the member device 101 may use a field in a MAC security tag (English: MAC security tag) as the key indication. After receiving the data packet, the member device 102 may determine, based on a field that is in the data packet and that is used to indicate a SAK, that the indicated SAK is the SAK 1, and determine, based on a correspondence between the SAK and the cipher suite, that integrity processing and encryption are performed, by using the SAK 1 and the cipher suite 1, on data carried in the data packet. In this way, the member device 102 may perform integrity check and decryption on the data by using the SAK 1 and the cipher suite 1.

For another example, it is assumed that the member device 101 sends the cipher suite 2 and the SAK 2 to the member device 102. When sending data to the member device 102, the member device 101 may perform integrity processing and encryption on the data by using the cipher suite 2 and the SAK 2. In addition, when the member device 101 sends the data to the member device 102, the data carries a key indication, and the key indication is used to indicate the SAK 2. For example, the member device 101 may use a field in a MAC security tag (English: MAC security tag) as the key indication. After receiving the data packet, the member device 102 may determine, based on a field that is in the data packet and that is used to indicate a SAK, that the indicated SAK is the SAK 2, and determine, based on a correspondence between the SAK and the cipher suite, that integrity processing and encryption are performed, by using the SAK 2 and the cipher suite 2, on data carried in the data packet. In this way, the member device 102 may perform integrity check and decryption on the data by using the SAK 2 and the cipher suite 2.

A method of performing MACsec secure data transmission by a member device in the CA 200 shown in FIG. 2 is the same as the method of performing data transmission by the member device in the CA 100, and details are not described herein again.

To help a person skilled in the art understand the technical solutions in this application better, the following describes the technical solutions in this application with reference to specific embodiments. It may be understood that, the technical solutions are merely intended to help a person skilled in the art understand this application better, but not intended to limit the technical solutions in this application.

Figure 4:
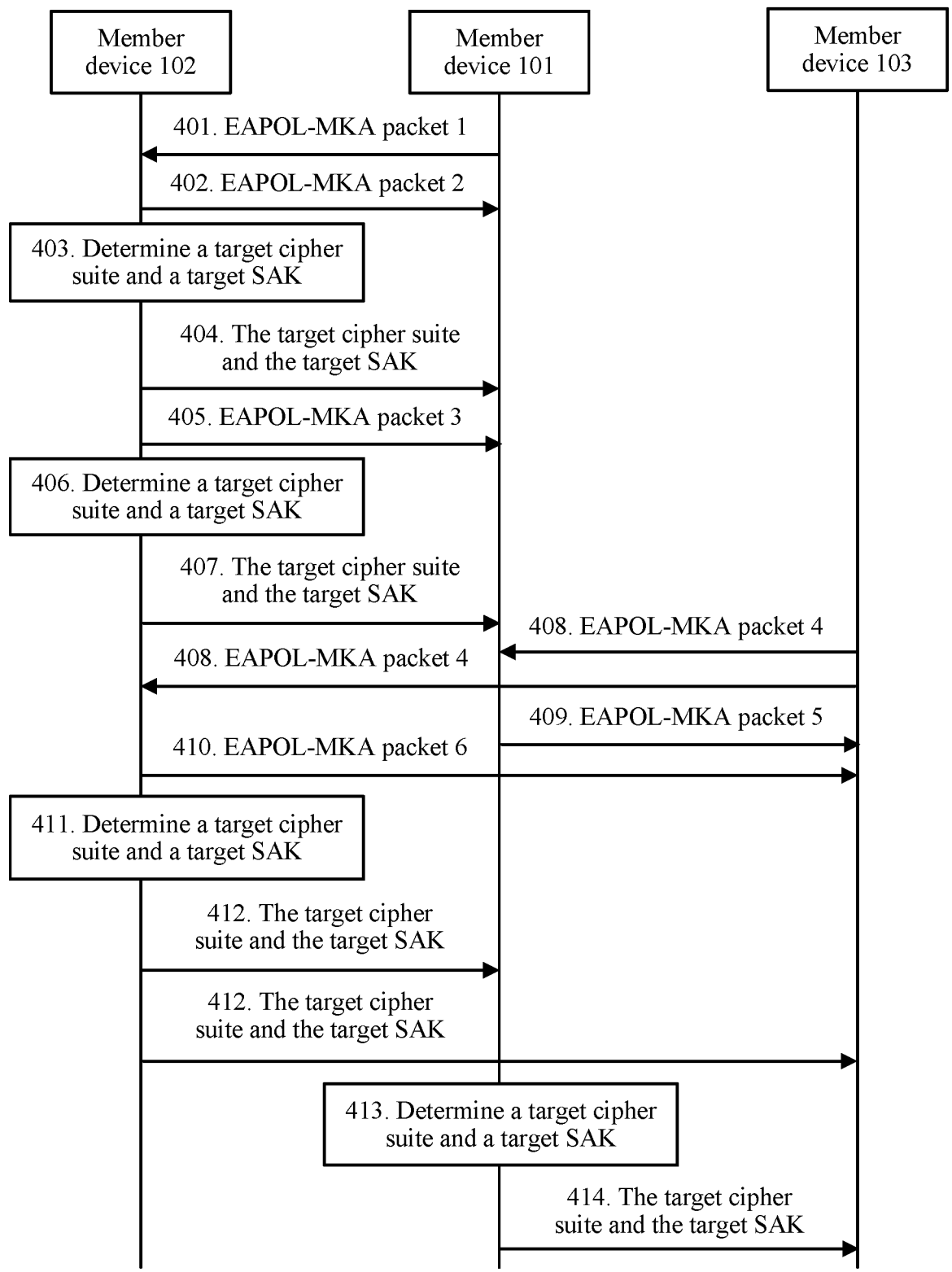
FIG. 4 is a schematic flowchart of another data transmission security protection method according to an embodiment of this application.

FIG. 4 is a schematic flowchart of another data transmission security protection method according to an embodiment of this application. The method shown in FIG. 4 is based on the CA 100 shown in FIG. 1. For ease of description, the CA 100 is an established CA. In addition, unless otherwise specified, a key server in the CA 100 is the member device 102.

401. The member device 101 sends an EAPOL-MKA packet 1 to the member device 102.

The EAPOL-MKA packet 1 carries a cipher suite list used to indicate a cipher suite supported by the member device 101. The EAPOL-MKA packet 1 may further carry identity information of the member device 101 and a sequence number of the EAPOL-MKA packet 1.

402. The member device 102 sends an EAPOL-MKA packet 2 to the member device 101.

The EAPOL-MKA packet 2 carries a cipher suite list used to indicate a cipher suite supported by the member device 102. The EAPOL-MKA packet 2 further carries identity information of the member device 102 and a sequence number of the EAPOL-MKA packet 2. In addition, the EAPOL-MKA packet 2 may further carry feedback information, and the feedback information may include the identity information of the member device 101 and the sequence number of the EAPOL-MKA packet 1.

The member device 101 may further send, to the member device 102, an EAPOL-MKA packet carrying feedback information. The EAPOL-MKA packet includes the feedback information, and the feedback information may include the identity information of the member device 102 and the sequence number of the EAPOL-MKA packet 2. Further, as described in the embodiment in FIG. 3, after receiving an EAPOL-MKA packet including a cipher suite list, each member device may return, to a transmit end of the EAPOL-MKA packet, an EAPOL-MKA packet carrying feedback information. However, for ease of description, the EAPOL-MKA packet carrying the feedback information is not shown in the embodiment shown in FIG. 4.

403. The member device 102 determines a target cipher suite and a target SAK corresponding to the target cipher suite.

Specifically, Table 1 shows cipher suites supported by the member device 101 and the member device 102 in the CA.

TABLE 1

| Device | Supported Cipher Suite |
|---|---|
| 101 | $C_1, C_2, C_3, C_4, C_5$ |
| 102 | $C_1, C_2, C_3$ |

It is assumed that a priority of a cipher suite is security strength of the cipher suite, and security strength of a cipher suite $C_n$ is lower than security strength of a cipher suite $C_{n+1}$ (n is a positive integer). In this case, in the cipher suites shown in Table 1, a priority of $C_5$ is the highest, and a priority of $C_1$ is the lowest. $C_1$ is the default cipher suite. In this case, the member device 102 may determine $C_3$ as the required target cipher suite, and determine the target SAK corresponding to the target cipher suite. It is assumed that a SAK corresponding to $C_3$ is a $SAK_3$. The target cipher suite is a cipher suite that can be used by a device in the CA.

404. The member device 102 sends the determined target cipher suite and target SAK to the member device 101.

After step 404, the cipher suite supported by the member device 102 is updated. In this case, the target cipher suite may be updated by using step 405 and step 406.

405. The member device 102 sends an EAPOL-MKA packet 3 to the member device 101.

An EAPOL-MKA packet 4 includes an updated cipher suite supported by the member device 102. It is assumed that a cipher suite $C_4$ is newly added, based on Table 1, to the cipher suite supported by the member device 102. Optionally, a cipher suite list in the EAPOL-MKA packet 3 may indicate all cipher suites supported by the member device 103, or may indicate only the newly added cipher suite, and indicate that the cipher suite is a newly added cipher suite.

406. The member device 102 determines a target cipher suite and a target SAK corresponding to the target cipher suite.

Because the member device 101 also supports the cipher suite $C_4$, and a priority of $C_4$ is higher than that of $C_3$, the member device 102 may update the target cipher suite to $C_4$, and determine the target SAK corresponding to the updated target cipher suite. It is assumed that a SAK corresponding to $C_4$ is a $SAK_4$.

407. The member device 102 sends the updated target cipher suite and target SAK.

It may be understood that, in step 405, it is assumed that the member device 102 newly adds a supported cipher suite. In some cases, the member device 102 may reduce the supported cipher suite, or a quantity of supported cipher suites does not change but content changes. Similarly, in these cases, the member device 102 may send all supported cipher suites to the member device 101, or may send only a reduced cipher suite or an updated cipher suite to the member device 102, and indicate the member device 102 that the cipher suite is a reduced cipher suite.

After step 407, a member device 103 joins the CA 100. Then, step 408 to step 412 may be performed, to update the target cipher suite and the target SAK.

408. A member device 103 sends EAPOL-MKA packets 4 to the member device 101 and the member device 102 in a multicast manner.

The EAPOL-MKA packet 4 carries a cipher suite list used to indicate a cipher suite supported by the member device 103. The EAPOL-MKA packet 4 may further carry identity information of the member device 103 and a sequence number of the EAPOL-MKA packet 4.

409. The member device 101 sends an EAPOL-MKA packet 5 to the member device 103.

The EAPOL-MKA packet 5 carries the cipher suite list used to indicate the cipher suite supported by the member device 101. The EAPOL-MKA packet 5 may further carry the identity information of the member device 101 and a sequence number of the EAPOL-MKA packet 5.

410. The member device 102 sends an EAPOL-MKA packet 6 to the member device 103.

The EAPOL-MKA packet 6 carries the cipher suite list used to indicate the cipher suite supported by the member device 102. The EAPOL-MKA packet 6 may further carry the identity information of the member device 102 and a sequence number of the EAPOL-MKA packet 6.

411. The member device 102 determines a target cipher suite and a target SAK.

Table 2 shows cipher suites supported by the member device 101, the member device 102, and the member device 103.

TABLE 2

| Device | Supported Cipher Suite |
|---|---|
| 101 | $C_1, C_2, C_3, C_4, C_5$ |
| 102 | $C_1, C_2, C_3, C_4$ |
| 103 | $C_1, C_3, C_5$ |

Because the cipher suite $C_4$ is no longer supported by all member devices in the CA, the member device 102 may update the target cipher suite to a cipher suite that is supported by all the member devices and that has a highest priority, to be specific, $C_3$. In addition, the member device 102 may determine the target SAK corresponding to the target cipher suite, to be specific, the $SAK_3$.

412. The member device 102 sends the target cipher suite and the target SAK to the member device 101 and the member device 103.

After step 412, the member device 102 exits the CA 100. In this case, because the member device serving as the key server exits the CA 100, the key server needs to be re-determined. If a priority of the member device 101 is the highest, an identity of the member device 101 may be determined as the key server. After the member device 101 is determined as the key server, step 413 may be performed, to update the target cipher suite and the target SAK.

413. The member device 101 determines a target cipher suite and a target SAK.

Because the member device 102 exits the CA 100, a cipher suite that is supported by all member devices in the current CA 100 and that has a highest priority changes to $C_5$. In this case, the member device 101 may update the target cipher suite to $C_5$. In addition, the member device 101 may further determine the target SAK corresponding to the target cipher suite, to be specific, a $SAK_5$. 414. The member device 101 sends the target cipher suite and the target SAK to the member device 103.

Figure 5:
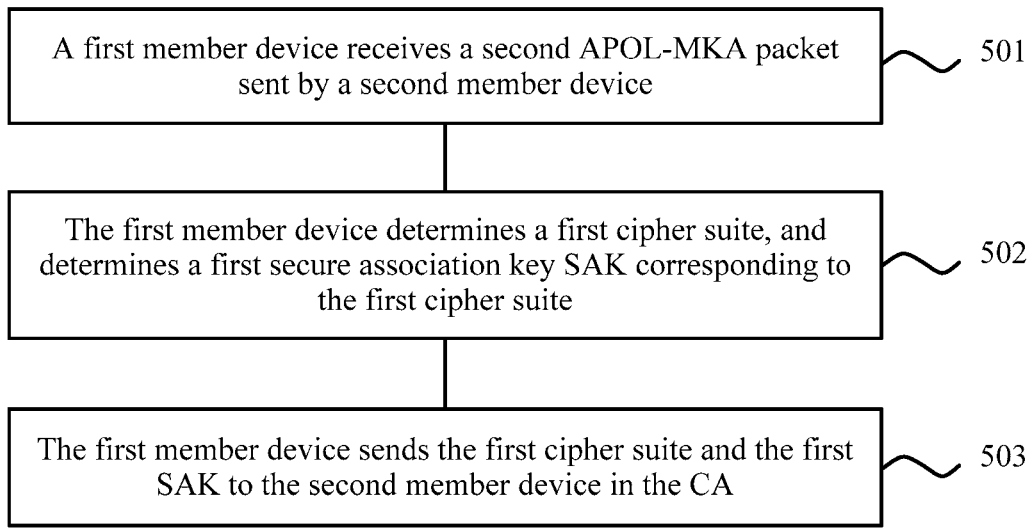
FIG. 5 is a schematic flowchart of a data transmission security protection method according to an embodiment of this application.

FIG. 5 is a schematic flowchart of a data transmission security protection method according to an embodiment of this application.

501. A first member device receives a second APOL-MKA packet sent by a second member device, where the second EAPOL-MKA packet includes a second cipher suite list, the second cipher suite list is used to indicate a cipher suite supported by the second member device, and the first member device and the second member device belong to a same CA.

502. The first member device determines a first cipher suite, and determines a first secure association key SAK corresponding to the first cipher suite, where the first cipher suite is a cipher suite supported by all member devices in the CA, and the first cipher suite belongs to the cipher suite indicated by the second cipher suite list.

503. The first member device sends the first cipher suite and the first SAK to the second member device in the CA.

According to the method shown in FIG. 5, a device in the CA may determine a cipher suite and a secure association key corresponding to the cipher suite that are used for MACsec secure data transmission. In addition, all the devices in the CA support the determined cipher suite. In this way, a problem that the cipher suite needs to be re-determined because one or more devices do not support the cipher suite determined by the first device can be avoided.

It can be learned that, in the method shown in FIG. 5, the first member device is responsible for determining and sending the cipher suite and the SAK. Therefore, the first member device is a key management device that is responsible for determining and sending the cipher suite and the SAK. More specifically, the first member device in the method shown in FIG. 5 may be an authentication server in a host-oriented mode.

In addition, the second member device in FIG. 5 and the following embodiments is a member device in the CA other than the key management device. For example, in the CA 100 shown in FIG. 1, if the member device 101 is the key management device, the member device 101 is the first member device in the embodiment shown in FIG. 5, and the member device 102 is the second member device in the embodiment shown in FIG. 5. Further, when the CA includes three or more member devices, each member device in the CA other than the member device serving as the key management device may serve as the second member device. In other words, if a member device in the CA sends, to the key management device, a cipher suite supported by the member device, and obtains the cipher suite and the SAK sent by the key management device, the member device is the second member device. For example, in the CA 200 shown in FIG. 3, if the member device 201 is the key management device, the member device 101 is the first member device in the embodiment shown in FIG. 5, and both the member device 202 and the member device 203 may be the second member device in the embodiment shown in FIG. 5. For a specific step and a beneficial effect of the method shown in FIG. 5, refer to the embodiment shown in FIG. 3. The first member device may be the key management device in the embodiment shown in FIG. 3.

Optionally, in some embodiments, the second EAPOL-MKA packet further includes a key server priority of the second member device, and the key server priority is used to negotiate a key server. Before the first member device determines the first cipher suite, the method may further include: sending, by the first member device, a first EAPOL-MKA packet to the second member device, where the first EAPOL-MKA packet includes a first cipher suite list and a key server priority of the first member device, and the first cipher suite list is used to indicate a cipher suite supported by the first member device; and determining, by the first member device, an identity of the first member device as the key server based on the key server priority of the first member device and the key server priority of the second member device. In these embodiments, the first member device may be a member device selected as the key server in a device-oriented mode. In the foregoing technical solution, because an EAPOL-MKA packet carries a key server priority and a cipher suite list, based on the key server priority and the cipher suite list in the received EAPOL-MKA packet, the first member device may determine the member device as the key server, and determine a required cipher suite and a corresponding SAK. The first member device does not need to wait for a next EAPOL-MKA packet. In this way, signaling overheads may be reduced. For a specific step in these embodiments, refer to the embodiment shown in FIG. 3. In addition, the first member device may be a member device that is first selected as the key server at the beginning of establishing the CA, or may be a member device that is re-selected as the key server in a running process of the CA. For example, the first member device may be a member device newly joining the CA in the event 1 in the embodiment shown in FIG. 3. For another example, the first member device may be a member device newly selected after the event 2 in the embodiment shown in FIG. 3 occurs.

Optionally, in some embodiments, after the first member device sends the first cipher suite and the first SAK to the second member device in the CA, the method further includes: determining, by the first member device, that a third member device joins the CA; receiving, by the first member device, a third EAPOL-MKA packet sent by the third member device, where the third EAPOL-MKA packet includes a third cipher suite list, and the third cipher suite list is used to indicate a cipher suite supported by the third member device; determining, by the first member device, a second cipher suite, where the second cipher suite is a cipher suite supported by all the member devices in the CA, and the second cipher suite belongs to a cipher suite indicated by the second cipher suite list and the third cipher suite list; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to the second member device and the third member device in the CA. Similar to the second member device, the third member device may also be any member device joining the CA. For a specific step in these embodiments, refer to the embodiment shown in FIG. 3.

Optionally, in some embodiments, after the first member device sends the first cipher suite and the first SAK to the second member device in the CA, the method further includes: determining, by the first member device, that the second member device exits the CA; determining, by the first member device, a second cipher suite, where the second cipher suite is a cipher suite supported by all the member devices in the CA; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to each member device in the CA. It may be understood that, the CA needs to include at least two member devices. Therefore, in these embodiments, before the second member device exits the CA, the CA should include at least three member devices. For a specific step in these embodiments, refer to the embodiment shown in FIG. 3.

Optionally, in some embodiments, after the first member device sends the first cipher suite and the first SAK to the second member device in the CA, the method further includes: receiving, by the first member device, a third EAPOL-MKA packet sent by the second member device, where the third EAPOL-MKA packet includes an updated cipher suite list, and the updated cipher suite list is used to indicate a cipher suite supported by the second member device after the second member device updates the cipher suite list; determining, by the first member device, a second cipher suite, where the second cipher suite is a cipher suite supported by all the member devices in the CA, and the second cipher suite belongs to the cipher suite indicated by the updated cipher suite list; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to the second member device in the CA. For a specific step in these embodiments, refer to the embodiment shown in FIG. 3.

Optionally, in some embodiments, after the first member device sends the first cipher suite and the first SAK to the second member device in the CA, the method further includes: updating, by the first member device, the cipher suite supported by the first member device; determining, by the first member device, a second cipher suite, where the second cipher suite is a cipher suite supported by all the member devices in the CA, and the second cipher suite belongs to a cipher suite updated by the first member device; determining, by the first member device, whether the second cipher suite is the same as the first cipher suite; when determining that the second cipher suite is different from the first cipher suite, determining, by the first member device, a second SAK corresponding to the second cipher suite; and sending, by the first member device, the second cipher suite and the second SAK to each member device in the CA. Further, the first member device may also send, to the second member device by using an EAPOL-MKA packet, the cipher suite list used to indicate the cipher suite updated by the first member device. For a specific step in these embodiments, refer to the embodiment shown in FIG. 3.

Optionally, in some embodiments, the method further includes: receiving, by the first member device, a data packet sent by the second member device; determining, by the first member device based on a key indication in the data packet, a target cipher suite and a target SAK corresponding to the target cipher suite that are used to perform integrity check and decryption on the data packet, where the target cipher suite and the target SAK are sent by the first member device; and performing, by the first member device, integrity check and decryption on the data packet by using the target cipher suite and the target SAK. For a specific step in these embodiments, refer to the embodiment shown in FIG. 3.

Although a second cipher suite and a second SAK are used in all the foregoing plurality of embodiments, with reference to the embodiments, it may be understood that, second cipher suites and second SAKs in different embodiments are different. For example, in the embodiments in which the third member device joins the CA, the second cipher suite is equivalent to the cipher suite 2 in the embodiment in FIG. 3, and the second SAK is equivalent to the SAK 2 in the embodiment shown in FIG. 3. For another example, in the embodiments in which the second member device exits the CA, the second cipher suite is equivalent to the cipher suite 3 in the embodiment in FIG. 3, and the second SAK is equivalent to the SAK 3 in the embodiment shown in FIG. 3. For still another example, in the embodiments in which the cipher suite supported by the second member device or the first member device is updated, the second cipher suite is equivalent to the cipher suite 4 in the embodiment in FIG. 3, and the second SAK is equivalent to the SAK 4 in the embodiment in FIG. 3. In addition, although a third EAPOL-MKA packet is used in all the foregoing plurality of embodiments, based on content carried in the third EAPOL-MKA packet, it can be learned that, different third EAPOL-MKA packets are different.

Further, in the foregoing embodiment, if a member device in the CA uses a device-oriented mode, when the third member device joins the CA, the member device serving as the key server needs to be re-determined. In some embodiments, before the first member device determines the second cipher suite, the first member device may determine the identity of the first member device as the key server based on the key server priority of the first member device, the key server priority of the second member device, and a key server priority of the third member device.

It may be understood that, in some embodiments, a member device other than the first member device may determine an identity of the member device as the key server. In this case, steps performed the member device serving as the key server are the same as the steps performed by the first member device serving as the key server. In this case, the newly selected member device serving as the key server may also be considered as the first member device. Similarly, in some embodiments, the first member device may exit the CA. In this case, a member device needs to be re-selected as the key server. A selection method is the same as the method of selecting the first member device as the key server, and details are not described herein again. In this case, the newly selected member device serving as the key server may also be considered as the first member device.

In conclusion, regardless of whether a member device newly joining the CA is selected as the key server or a member device whose original identity is not the key server is selected as the key server, the newly selected member device serving as the key server may be considered as the first member device.

The following provides a detailed description by using an example in which a member device whose original identity is not the key server is selected as the key server. In an example in which the CA 200 shown in FIG. 2 is used, it is assumed that a key server priority of the member device 202 is the highest, a key server priority of the member device 201 is lower than the key server priority of the member device 202, and a key server priority of the member device 203 is lower than the key server priority of the member device 201. After the CA 200 is established, each member device in the CA 200 sends, to another member device in a multicast manner, EAPOL-MKA packets carrying a cipher suite list used to indicate a cipher suite supported by each member device. For a specific process of sending, by each member device, the EAPOM-MKA packet, refer to the description in step 302 in the method shown in FIG. 3, and details are not described herein again. In this case, the member device 202 may receive an EAPOL-MKA packet sent by the member device 203. The member device 201 may also receive the EAPOL-MKA packet sent by the member device 203. The member device 202 may determine a required target cipher suite and a target SAK based on the received EAPOL-MKA packet, and then send the target cipher suite and the target SAK to the member device 203. It is assumed that, at a moment $T_1$, the member device 201 exits the CA 200, and no new member device joins the CA 200. In this case, a key server needs to be re-selected in the CA 200. Because the key server priority of the member device 201 is higher than the key server priority of the member device 203, the member device 201 is selected as the key server priority. The member device 201 may re-determine a target cipher suite and a target SAK based on a received EAPOL-MKA packet, and then send the target cipher suite and the target SAK to the member device 203. It can be learned that, the key server selected before the moment $T_1$ and the key server selected after the moment $T_1$ are different, but actions performed by the two key servers are the same. Similarly, a step performed by a member device that newly joins the CA and that is selected as the key server is also the same as a step performed by a member device selected as the key server when the CA is established. Therefore, the first member device in the foregoing embodiments and the method shown in FIG. 5 may be a member device selected as the key server at the beginning of establishing the CA, or may be a member device selected as the key server in another case.

Figure 6:
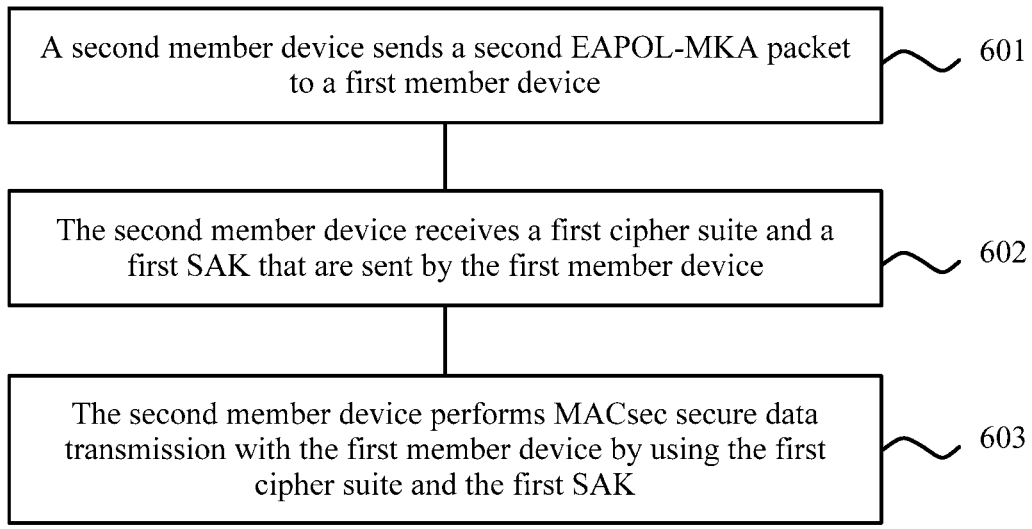
FIG. 6 is a schematic flowchart of a data transmission security protection method according to an embodiment of this application.

FIG. 6 is a schematic flowchart of a data transmission security protection method according to an embodiment of this application.

601. A second member device sends a second EAPOL-MKA packet to a first member device, where the second EAPOL-MKA packet includes a second cipher suite, the second cipher suite is used to indicate a cipher suite supported by the second member device, and the second member device and the first member device are in a same CA.

602. The second member device receives a first cipher suite and a first SAK that are sent by the first member device, where the first cipher suite belongs to the cipher suite indicated by the second cipher suite list.

603. The second member device performs MACsec secure data transmission with the first member device by using the first cipher suite and the first SAK.

Optionally, in some embodiments, the second EAPOL-MKA packet further includes a key server priority of the second member device, and the key server priority is used to negotiate a key server. Before the second member device receives the first cipher suite and the first SAK that are sent by the first member device, the method further includes: receiving, by the second member device, a first EAPOL-MKA packet sent by the first member device, where the first EAPOL-MKA packet includes a first cipher suite list and a key server priority of the first member device, and the first cipher suite list is used to indicate a cipher suite supported by the first member device; and determining, by the second member device, an identity of the second member device as a member device based on the key server priority of the first member device and the key server priority of the second member device.

Optionally, in some embodiments, the method further includes: receiving, by the second member device, a second cipher suite and a second SAK that are sent by the first member device, where the second cipher suite belongs to the cipher suite indicated by the second cipher suite list, and the second cipher suite and the second SAK are determined by the first member device based on a case in which a new member device joins the CA, or a case in which a member device in the CA exits the CA; and performing, by the second member device, MACsec secure data transmission with the first member device by using the second cipher suite and the second SAK. Further, in some embodiments, the second cipher suite and the second SAK may be determined by the first member device based on a cipher suite updated by the first member device, or may be determined by the first member device based on a cipher suite updated by another member device other than the first member device and the second member device in the CA.

Optionally, in some embodiments, the method further includes: sending, by the second member device, a third EAPOL-MKA packet to the first member device, where the third EAPOL-MKA packet includes an updated cipher suite list, and the updated cipher suite list is used to indicate a cipher suite supported by the second member device after the second member device updates the cipher suite list; receiving, by the second member device, a second cipher suite and a second SAK that are sent by the first member device, where the second cipher suite belongs to the cipher suite indicated by the updated cipher suite list; and performing, by the second member device, MACsec secure data transmission with the first member device by using the second cipher suite and the second SAK.

It may be understood that, the second member device in the foregoing embodiments and the method shown in FIG. 6 may be each member device that is in the CA and that is not selected as the key server. Still in an example in which the CA 200 shown in FIG. 2 is used, if the member device 202 is selected as the key server, both the member device 201 and the member device 203 may be considered as the second member device.

An embodiment of this application further provides a network device, and the network device may be a first member device. The network device includes a receiving unit, a control unit, and a sending unit.

The receiving unit is configured to receive a second Extensible Authentication Protocol over local area network-Media Access Control security key agreement EAPOL-MKA packet sent by a second member device, where the second EAPOL-MKA packet includes a second cipher suite list, the second cipher suite list is used to indicate a cipher suite supported by the second member device, and the network device and the second member device belong to a same connectivity association CA.

The control unit is configured to: determine a first cipher suite, and determine a first secure association key SAK corresponding to the first cipher suite, where the first cipher suite is a cipher suite supported by all member devices in the CA, and the first cipher suite belongs to the cipher suite indicated by the second cipher suite list.

The sending unit is configured to send the first cipher suite and the first SAK to the second member device in the CA.

Optionally, in some embodiments, the second EAPOL-MKA packet further includes a key server priority of the second member device, and the key server priority is used to negotiate a key server. The sending unit is further configured to send a first EAPOL-MKA packet to the second member device, where the first EAPOL-MKA packet includes a first cipher suite list and a key server priority of the network device, and the first cipher suite list is used to indicate a cipher suite supported by the network device. The control unit is further configured to determine an identity of the network device as the key server based on the key server priority of the network device and the key server priority of the second member device.

Optionally, in some embodiments, the control unit is further configured to determine that a third member device joins the CA. The receiving unit is further configured to receive a third EAPOL-MKA packet sent by the third member device, where the third EAPOL-MKA packet includes a third cipher suite list, and the third cipher suite list is used to indicate a cipher suite supported by the third member device. The control unit is further configured to determine a second cipher suite, where the second cipher suite is a cipher suite supported by all the member devices in the CA, and the second cipher suite belongs to a cipher suite indicated by the second cipher suite list and the third cipher suite list. The control unit is further configured to determine whether the second cipher suite is the same as the first cipher suite. The control unit is further configured to: when determining that the second cipher suite is different from the first cipher suite, determine a second SAK corresponding to the second cipher suite. The sending unit is further configured to send the second cipher suite and the second SAK to the second member device and the third member device in the CA.

Optionally, in some embodiments, the control unit is further configured to determine that the second member device exits the CA. The control unit is further configured to determine a second cipher suite, where the second cipher suite is a cipher suite supported by all the member devices in the CA. The control unit is further configured to determine whether the second cipher suite is the same as the first cipher suite. The control unit is further configured to: when determining that the second cipher suite is different from the first cipher suite, determine a second SAK corresponding to the second cipher suite. The sending unit is further configured to send the second cipher suite and the second SAK to each member device in the CA.

Optionally, in some embodiments, the receiving unit is further configured to receive a third EAPOL-MKA packet sent by the second member device, where the third EAPOL-MKA packet includes an updated cipher suite list, and the updated cipher suite list is used to indicate a cipher suite supported by the second member device after the second member device updates the cipher suite list. The control unit is further configured to determine a second cipher suite, where the second cipher suite is a cipher suite supported by all the member devices in the CA, and the second cipher suite belongs to the cipher suite indicated by the updated cipher suite list. The control unit is further configured to determine whether the second cipher suite is the same as the first cipher suite. The control unit is further configured to: when determining that the second cipher suite is different from the first cipher suite, determine a second SAK corresponding to the second cipher suite. The sending unit is further configured to send the second cipher suite and the second SAK to the second member device in the CA.

Optionally, in some embodiments, the control unit is further configured to update the cipher suite supported by the first member device. The control unit is further configured to determine a second cipher suite, where the second cipher suite is a cipher suite supported by all the member devices in the CA, and the second cipher suite belongs to a cipher suite updated by the first member device. The control unit is further configured to determine whether the second cipher suite is the same as the first cipher suite. The control unit is further configured to: when determining that the second cipher suite is different from the first cipher suite, determine a second SAK corresponding to the second cipher suite. The sending unit is further configured to send the second cipher suite and the second SAK to each member device in the CA.

Optionally, in some embodiments, the receiving unit is further configured to receive a data packet sent by the second member device. The control unit is further configured to determine, based on a key indication in the data packet, a target cipher suite and a target SAK corresponding to the target cipher suite that are used to perform integrity check and decryption on the data packet, where the target cipher suite and the target SAK are sent by the first member device. The control unit is further configured to perform integrity check and decryption on the data packet by using the target cipher suite and the target SAK.

Optionally, in some embodiments, the processing unit may be implemented by a processor, the sending unit may be implemented by a transmitter or a transceiver, and the receiving unit may be implemented by a receiver or a transceiver.

An embodiment of this application further provides a network device, and the network device may be a second member device. The network device includes a sending unit, a receiving unit, and a control unit.

The sending unit is configured to send a second Extensible Authentication Protocol over local area network-Media Access Control security key agreement EAPOL-MKA packet to a first member device, where the second EAPOL- MKA packet includes a second cipher suite, the second cipher suite is used to indicate a cipher suite supported by the network device, and the network device and the first member device are in a same connectivity association CA.

The receiving unit is configured to receive a first cipher suite and a first secure association key SAK that are sent by the first member device, where the first cipher suite belongs to the cipher suite indicated by the second cipher suite list.

The control unit is configured to determine to perform MACsec secure data transmission with the first member device by using the first cipher suite and the first SAK.

Optionally, in some embodiments, the second EAPOL-MKA packet further includes a key server priority of the network device, and the key server priority is used to negotiate a key server. The receiving unit is further configured to receive a first EAPOL-MKA packet sent by the first member device, where the first EAPOL-MKA packet includes a first cipher suite list and a key server priority of the first member device, and the first cipher suite list is used to indicate a cipher suite supported by the first member device. The control unit is further configured to determine an identity of the network device as a member device based on the key server priority of the first member device and the key server priority of the network device.

Optionally, in some embodiments, the receiving unit is further configured to receive a second cipher suite and a second SAK that are sent by the first member device, where the second cipher suite belongs to the cipher suite indicated by the second cipher suite list, and the second cipher suite and the second SAK are determined by the first member device based on a case in which a new member device joins the CA, or a case in which a member device in the CA exits the CA. The control unit is further configured to determine to perform MACsec secure data transmission with the first member device by using the second cipher suite and the second SAK.

Optionally, in some embodiments, the sending unit is further configured to send a third EAPOL-MKA packet to the first member device, where the third EAPOL-MKA packet includes an updated cipher suite list, and the updated cipher suite list is used to indicate a cipher suite supported by the network device after the network device updates the cipher suite list. The receiving unit is further configured to receive a second cipher suite and a second SAK that are sent by the first member device, where the second cipher suite belongs to the cipher suite indicated by the updated cipher suite list. The control unit is further configured to determine to perform MACsec secure data transmission with the first member device by using the second cipher suite and the second SAK.

Optionally, in some embodiments, the control unit may be implemented by a processor, the sending unit may be implemented by a transmitter or a transceiver, and the receiving unit may be implemented by a receiver or a transceiver.

Figure 7:
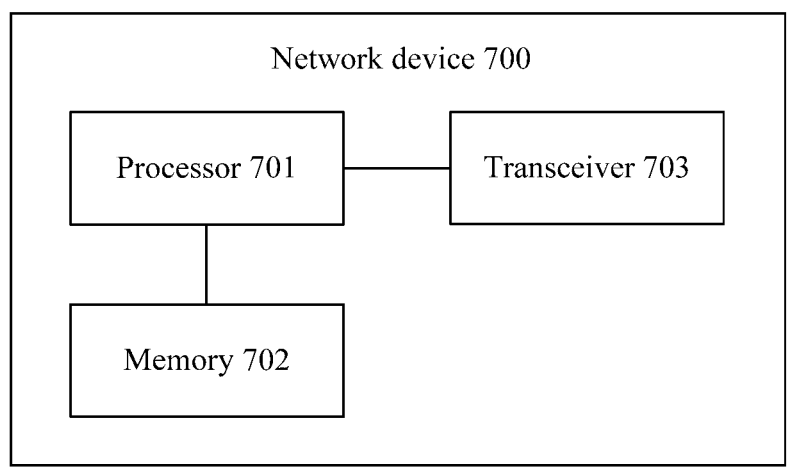
FIG. 7 is a structural block diagram of a network side device according to an embodiment of this application.

FIG. 7 is a structural block diagram of a network side device according to an embodiment of this application. As shown in FIG. 7, the network device 700 includes a processor 701, a memory 702, and a transceiver 703.

The method disclosed in the foregoing embodiment of this application may be applied to the processor 701, or may be implemented by the processor 701. The processor 701 may be an integrated circuit chip, and has a signal processing capability. In an implementation process, the steps of the foregoing method may be completed by using an integrated logic circuit of hardware in the processor 701 or an instruction in a form of software. The processor 701 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, or a discrete hardware component, and may implement or perform the methods, the steps, and the logical block diagrams disclosed in the embodiments of this application. The general purpose processor may be a microprocessor, or the processor may be any conventional processor, or the like. The steps of the methods disclosed in the embodiments of this application may be directly performed by a hardware decoding processor, or performed by using a combination of a hardware module and a software module in a decoding processor. The software module may be located in a mature storage medium in the art, for example, a random access memory (Random Access Memory, RAM), a flash memory, a read-only memory (Read-Only Memory, ROM), a programmable read-only memory or an electrically erasable programmable memory, or a register. The storage medium is located in the memory 702. The processor 701 reads an instruction from the memory 702, and completes the steps of the foregoing methods with reference to the hardware of the processor.

Optionally, in some embodiments, the memory 702 may store an instruction used to perform the method that is performed by the member device serving as the key management device in the method shown in FIG. 3. The processor 701 may execute the instruction stored in the memory 702, to complete, with reference to other hardware (such as the transceiver 703), the steps performed by the member device serving as the key management device in the method shown in FIG. 3. For a specific working process and a beneficial effect, refer to the description of the key management device in the embodiment shown in FIG. 3.

Optionally, in some embodiments, the memory 702 may store an instruction used to perform the method that is performed by the first member device in the method shown in FIG. 5. The processor 701 may execute the instruction stored in the memory 702, to complete, with reference to other hardware (such as the transceiver 703), the steps performed by the first member device in the method shown in FIG. 5. For a specific working process and a beneficial effect, refer to the description of the first member device in the embodiment shown in FIG. 5. It may be understood that, in these embodiments, the network device 700 is the first member device.

Optionally, in some other embodiments, the memory 702 may store an instruction used to perform the method that is performed by a member device other than the key management device in the method shown in FIG. 3. The processor 701 may execute the instruction stored in the memory 702, to complete, with reference to other hardware (such as the transceiver 703), the steps performed by the member device other than the key management device in the method shown in FIG. 7. For a specific working process and a beneficial effect, refer to the description of the member device other than the key management device in the embodiment shown in FIG. 3.

Optionally, in some embodiments, the memory 702 may store an instruction used to perform the method that is performed by the second member device in the method shown in FIG. 6. The processor 701 may execute the instruction stored in the memory 702, to complete, with reference to other hardware (such as the transceiver 703), the steps performed by the second member device in the method shown in FIG. 6. For a specific working process and a beneficial effect, refer to the description of the second member device in the embodiment shown in FIG. 6. It may be understood that, in these embodiments, the network device 700 is the second member device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a first member device, a second Extensible Authentication Protocol over local area network-Media Access Control security key agreement (EAPOL-MKA) packet sent by a second member device, wherein the second EAPOL-MKA packet comprises a second cipher suite list, the second cipher suite list is configured to indicate a cipher suite supported by the second member device, and the first member device and the second member device belong to a same connectivity association (CA);
    determining, by the first member device, a first cipher suite, and determining a first secure association key (SAK) corresponding to the first cipher suite, wherein the first cipher suite is a cipher suite supported by all member devices in the CA, and the first cipher suite belongs to the cipher suite indicated by the second cipher suite list; and
    sending, by the first member device, the first cipher suite and the first SAK to the second member device in the CA;
    receiving, by the first member device, a third EAPOL-MKA packet sent by the second member device, wherein the third EAPOL-MKA packet comprises an updated cipher suite list, and the updated cipher suite list is used to indicate a cipher suite supported by the second member device after the second member device updates the second cipher suite list;
    determining, by the first member device, a second cipher suite, wherein the second cipher suite is a cipher suite supported by all the member devices in the CA, and the second cipher suite belongs to the cipher suite indicated by the updated cipher suite list;
    determining, by the first member device, whether the second cipher suite is the same as the first cipher suite;
    when determining that the second cipher suite is different from the first cipher suite, determining, by the first member device, a second SAK corresponding to the second cipher suite; and
    sending, by the first member device, the second cipher suite and the second SAK to the second member device in the CA.

2. The method according to claim 1, wherein the second EAPOL-MKA packet further comprises a key server priority of the second member device, and the key server priority is used to negotiate a key server; and
    before the determining, by the first member device, a first cipher suite, the method further comprises:
    sending, by the first member device, a first EAPOL-MKA packet to the second member device, wherein the first EAPOL-MKA packet comprises a first cipher suite list and a key server priority of the first member device, and the first cipher suite list is used to indicate a cipher suite supported by the first member device; and
    determining, by the first member device, an identity of the first member device as the key server based on the key server priority of the first member device and the key server priority of the second member device.

3. The method according to claim 1, wherein the method further comprises:
receiving, by the first member device, a data packet sent by the second member device;
determining, by the first member device based on a key indication in the data packet, a target cipher suite and a target SAK corresponding to the target cipher suite that are used to perform integrity check and decryption on the data packet, wherein the target cipher suite and the target SAK are sent by the first member device; and
performing, by the first member device, integrity check and decryption on the data packet by using the target cipher suite and the target SAK.

4. A network device, wherein the network device is a first member device, and the network device comprises:
a transceiver, configured to receive a second Extensible Authentication Protocol over local area network-Media Access Control security key agreement (EAPOL-MKA) packet sent by a second member device, wherein the second EAPOL-MKA packet comprises a second cipher suite list, the second cipher suite list is configured to indicate a cipher suite supported by the second member device, and the network device and the second member device belong to a same connectivity association (CA);
a processor coupled to the transceiver, configured to: determine a first cipher suite, and determine a first secure association key (SAK) corresponding to the first cipher suite, wherein the first cipher suite is a cipher suite supported by all member devices in the CA, and the first cipher suite belongs to the cipher suite indicated by the second cipher suite list;
the transceiver, further configured to send the first cipher suite and the first SAK to the second member device in the CA;
the transceiver is further configured to receive a third EAPOL-MKA packet sent by the second member device, wherein the third EAPOL-MKA packet comprises an updated cipher suite list, and the updated cipher suite list is used to indicate a cipher suite supported by the second member device after the second member device updates the cipher suite list;
the processor is further configured to determine a second cipher suite, wherein the second cipher suite is a cipher suite supported by all the member devices in the CA, and the second cipher suite belongs to the cipher suite indicated by the updated cipher suite list;
the processor is further configured to determine whether the second cipher suite is the same as the first cipher suite;
the processor is further configured to: when determining that the second cipher suite is different from the first cipher suite, determine a second SAK corresponding to the second cipher suite; and
the transceiver is further configured to send the second cipher suite and the second SAK to the second member device in the CA.

5. The network device according to claim 4, wherein the second EAPOL-MKA packet further comprises a key server priority of the second member device, and the key server priority is used to negotiate a key server;
the transceiver is further configured to send a first EAPOL-MKA packet to the second member device, wherein the first EAPOL-MKA packet comprises a first cipher suite list and a key server priority of the network device, and the first cipher suite list is used to indicate a cipher suite supported by the network device; and
the processor is further configured to determine an identity of the network device as the key server based on the key server priority of the network device and the key server priority of the second member device.

6. The network device according to any one of claim 4, wherein the transceiver is further configured to receive a data packet sent by the second member device;
the processor is further configured to:
determine, based on a key indication in the data packet, a target cipher suite and a target SAK corresponding to the target cipher suite that are used to perform integrity check and decryption on the data packet, wherein the target cipher suite and the target SAK are sent by the first member device; and
perform integrity check and decryption on the data packet by using the target cipher suite and the target SAK.

7. A network device, wherein the network device is a second member device, and the network device comprises:
a transceiver, configured to send a second Extensible Authentication Protocol over local area network-Media Access Control security key agreement (EAPOL-MKA) packet to a first member device, wherein the second EAPOL-MKA packet comprises a second cipher suite, the second cipher suite is configured to indicate a second cipher suite supported by the network device, and the network device and the first member device are in a same connectivity association (CA);
the transceiver, further configured to receive a first cipher suite and a first secure association key (SAK) that are sent by the first member device, wherein the first cipher suite belongs to the cipher suite indicated by the second cipher suite list;
a processor coupled to the transceiver, configured to determine to perform Media Access Control security (MACsec) secure data transmission with the first member device by using the first cipher suite and the first SAK;
wherein the transceiver is further configured to send a third EAPOL-MKA packet to the first member device, wherein the third EAPOL-MKA packet comprises an updated cipher suite list, and the updated cipher suite list is used to indicate a cipher suite supported by the network device after the network device updates the cipher suite list;
the transceiver is further configured to receive a second cipher suite and a second SAK that are sent by the first member device, wherein the second cipher suite belongs to the cipher suite indicated by the updated cipher suite list; and
the processor is further configured to determine to perform MACsec secure data transmission with the first member device by using the second cipher suite and the second SAK.

8. The network device according to claim 7, wherein the second EAPOL-MKA packet further comprises a key server priority of the network device, and the key server priority is used to negotiate a key server;
the transceiver is further configured to receive a first EAPOL-MKA packet sent by the first member device, wherein the first EAPOL-MKA packet comprises a first cipher suite list and a key server priority of the first member device, and the first cipher suite list is used to indicate a cipher suite supported by the first member device; and the processor is further configured to determine an identity of the network device as a member device based on the key server priority of the first member device and the key server priority of the network device.

\* \* \* \* \*